(12) United States Patent
Park et al.

(10) Patent No.: US 12,498,860 B2
(45) Date of Patent: Dec. 16, 2025

(54) ELECTRONIC DEVICES INHERITING LIFETIME INFORMATION, AND METHODS OF OPERATING THE SAME

(71) Applicant: Samsung Electronics Co., Ltd., Suwon-si (KR)

(72) Inventors: Daejun Park, Suwon-si (KR); Keoseong Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 18/466,236

(22) Filed: Sep. 13, 2023

(65) Prior Publication Data

US 2024/0273068 A1 Aug. 15, 2024

(30) Foreign Application Priority Data

Feb. 10, 2023 (KR) .................. 10-2023-0018035

(51) Int. Cl.
*G06F 3/06* (2006.01)
*G06F 12/02* (2006.01)
*G06F 16/16* (2019.01)
*G06F 16/18* (2019.01)

(52) U.S. Cl.
CPC .......... *G06F 3/0617* (2013.01); *G06F 3/0649* (2013.01); *G06F 3/0679* (2013.01); *G06F 12/0292* (2013.01); *G06F 16/162* (2019.01); *G06F 16/1805* (2019.01)

(58) Field of Classification Search
CPC ............. G06F 12/0246; G06F 12/0292; G06F 16/162; G06F 16/1805; G06F 2212/1036; G06F 2212/1044; G06F 2212/7201; G06F 2212/7204; G06F 2212/7205; G06F 3/06; G06F 3/0617; G06F 3/0649; G06F 3/0679
USPC .................................................. 711/117, 103
See application file for complete search history.

(56) References Cited

U.S. PATENT DOCUMENTS

| 10,552,058 B1 * | 2/2020 | Jadon ..................... G06F 3/0656 |
| 10,656,838 B2 | 5/2020 | Yang et al. |
| 10,698,808 B2 | 6/2020 | Pandurangan et al. |
| 10,817,417 B1 | 10/2020 | Zhang et al. |

(Continued)

FOREIGN PATENT DOCUMENTS

| EP | 3885889 A1 | 9/2021 |
| WO | 2014164016 A2 | 10/2014 |

*Primary Examiner* — Hashem Farrokh
(74) *Attorney, Agent, or Firm* — Wolf, Greenfield & Sacks, P.C.

(57) ABSTRACT

A method of operating an electronic device which includes a host device and a storage device. The method includes initiating a first write operation of target data and a first logical block address (LBA), generating target identification information of the target data in response to initiating the first write operation, determining that the target identification information is registered at a mapping table of the host device, determining that the first LBA is different from a previous LBA corresponding to the target identification information in the mapping table, updating the mapping table such that the previous LBA is changed to the first LBA, providing the storage device with a first request for inheritance of previous lifetime information, and storing, in a history table of the storage device and based on the first request, first lifetime information that inherits the previous lifetime information.

20 Claims, 14 Drawing Sheets

(56) References Cited

U.S. PATENT DOCUMENTS

| | | |
|---|---|---|
| 11,221,944 B1 | 1/2022 | Wang et al. |
| 11,263,132 B2 | 3/2022 | Li |
| 11,429,519 B2 | 8/2022 | Li |
| 2015/0293713 A1* | 10/2015 | Seo .................. G11C 16/349 711/103 |
| 2018/0307598 A1* | 10/2018 | Fischer ................ G06F 3/0679 |
| 2020/0379883 A1* | 12/2020 | Mola .................. G06F 11/3476 |
| 2021/0026558 A1* | 1/2021 | Zhang .................. G06F 3/0679 |
| 2021/0303156 A1 | 9/2021 | Kachare et al. |
| 2023/0418490 A1* | 12/2023 | Muthiah ............... G06F 3/0688 |

\* cited by examiner

ELECTRONIC DEVICES INHERITING LIFETIME INFORMATION, AND METHODS OF OPERATING THE SAME

CROSS-REFERENCE TO RELATED APPLICATION

This application claims priority under 35 U.S.C. § 119 to Korean Patent Application No. 10-2023-0018035 filed on Feb. 10, 2023, in the Korean Intellectual Property Office, and the entire contents of the above-identified application are incorporated by reference herein.

TECHNICAL FIELD

Aspects of the present disclosure described herein relate to data management of storage devices, and more particularly, relate to electronic devices inheriting lifetime information and methods of operating the same.

BACKGROUND

A memory device stores data in response to a write request and outputs data stored therein in response to a read request. Memory devices may be classified as volatile memory devices or as non-volatile memory devices. For example, a volatile memory device loses data stored therein when a power is turned off, and examples of volatile memory devices include a dynamic random access memory (DRAM) device or a static RAM (SRAM) device. A non-volatile memory device retains data stored therein even when a power is turned off, and examples of non-volatile memory devices include a flash memory device, a phase-change RAM (PRAM), a magnetic RAM (MRAM), or a resistive RAM (RRAM).

A host device may store data in the memory device, may read the stored data, and may delete the stored data. A time period from a first time at which data are generated to a second time at which the data are deleted may be referred to as a "lifetime". Some data may have similar lifetimes. In a non-volatile memory device, the efficiency of data management may increase by integrally managing a plurality of data having similar lifetimes. Accordingly, techniques for managing lifetime information accurately are being investigated.

SUMMARY

Some embodiments of the present disclosure provide electronic devices inheriting lifetime information and methods of operating the same.

According to some embodiments, a method of operating an electronic device which includes a host device and a storage device includes initiating, by the host device, a first write operation of target data and a first logical block address (LBA), generating, by the host device, target identification information of the target data in response to initiating the first write operation, determining, by the host device, that the target identification information is registered at a mapping table of the host device, determining, by the host device, that the first LBA is different from a previous LBA corresponding to the target identification information in the mapping table, in response to determining that the target identification information is registered, updating, by the host device, the mapping table such that the previous LBA is changed to the first LBA, in response to determining that the first LBA is different from the previous LBA, providing, by the host device, the storage device with a first request for inheritance of previous lifetime information, in response to determining that the first LBA is different from the previous LBA, and storing, by the storage device and based on the first request, first lifetime information in a history table of the storage device, the first lifetime information inheriting the previous lifetime information.

According to some embodiments, a method of operating an electronic device which includes a host device and a storage device includes initiating, by the host device, a first write operation of target data and a first logical block address (LBA), storing, by the host device, a pair of target identification information of the target data and the first LBA in a mapping table of the host device, in response to initiating the first write operation, providing, by the host device, the storage device with a first request for registration of first lifetime information corresponding to the first LBA, in response to initiating the first write operation, storing, by the storage device, a pair of the first LBA and the first lifetime information in a history table of the storage device, based on the first request, initiating, by the host device, a second write operation of the target data and a second LBA, after processing the first write operation, updating, by the host device, the mapping table such that the first LBA is changed to the second LBA, in response to initiating the second write operation, providing, by the host device, the storage device with a second request for inheritance of the first lifetime information, in response to initiating the second write operation, and storing, by the storage device, a pair of the second LBA and second lifetime information inheriting the first lifetime information in the history table, based on the second request.

According to some embodiments, an electronic device includes a host device including a mapping table, and a storage device including a history table. The host device may be configured to initiate a write operation of target data and a target logical block address (LBA), generate target identification information of the target data in response to initiating the write operation, determine that the target identification information is registered at the mapping table, determine that the target LBA is different from a previous LBA corresponding to the target identification information in the mapping table, in response to determining that the target identification information is registered, and update the mapping table such that the previous LBA is changed to the target LBA and provide the storage device with a request for inheritance of previous lifetime information, in response to determining that the target LBA is different from the previous LBA. The storage device may be configured store, based on the request and in a history table, target lifetime information that inherits the previous lifetime information.

BRIEF DESCRIPTION OF THE FIGURES

The above and other objects and features of the present disclosure will become apparent by describing in detail embodiments thereof with reference to the accompanying drawings.

DETAILED DESCRIPTION

Below, some embodiments of the present disclosure will be described in detail and with sufficient clarity to permit one skilled in the art to carry out embodiments of the inventive concepts that are provided by present disclosure.

Components described in the detailed description with reference to terms "part," "unit," "module," "layer," etc. and function blocks illustrated in drawings may be implemented in the form of software, hardware, or a combination thereof. For example, the software may be a machine code, firmware, an embedded code, and/or application software. For example, the hardware may include an electrical circuit, an electronic circuit, a processor, a computer, an integrated circuit, integrated circuit cores, a pressure sensor, an inertial sensor, a MEMS (microelectromechanical system), or a passive element, or a combination of two or more thereof.

Figure 1:
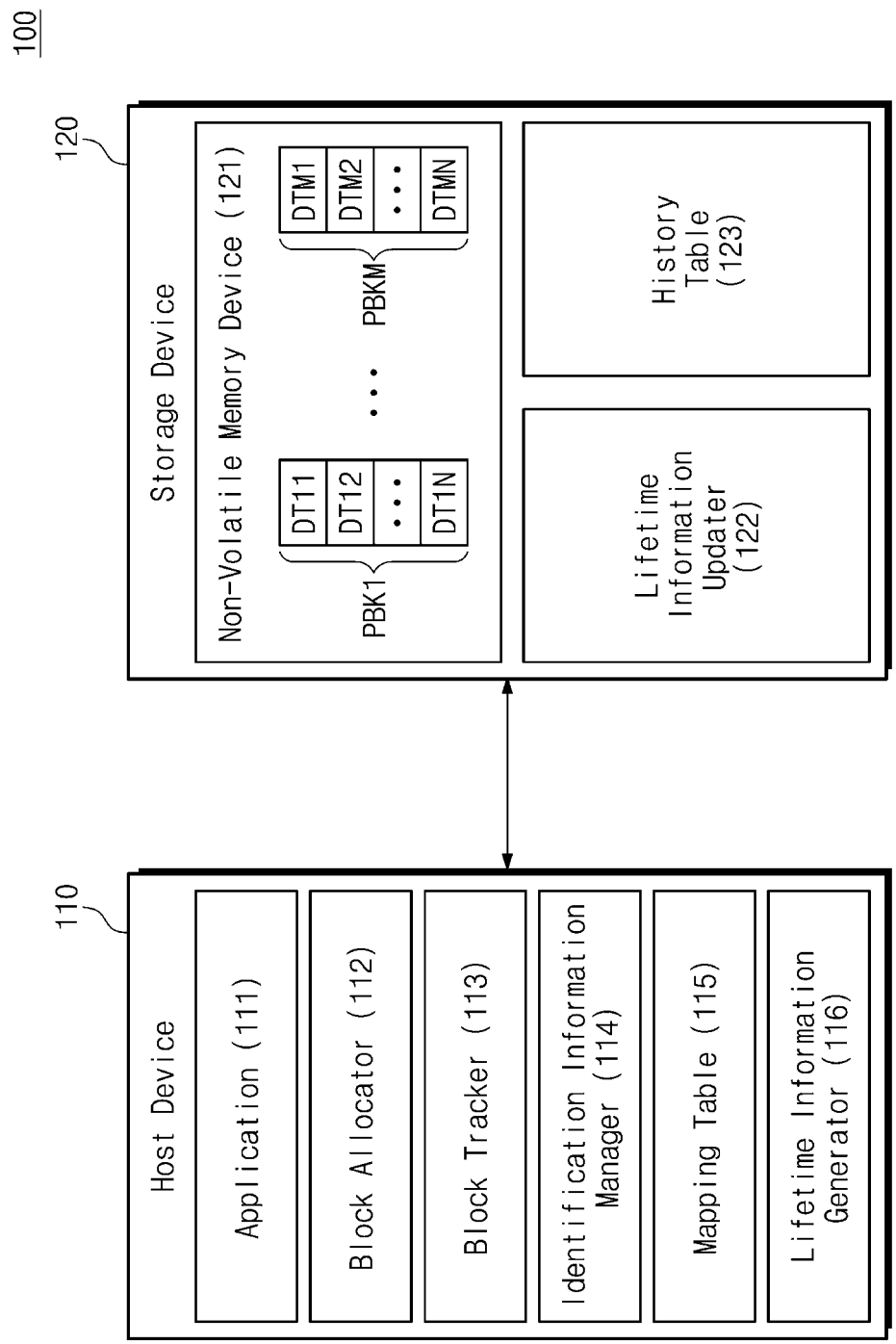
FIG. 1 is a block diagram of an electronic device according to some embodiments of the present disclosure.

FIG. 1 is a block diagram of an electronic device according to some embodiments of the present disclosure. Referring to FIG. 1, an electronic device 100 may include a host device 110 and a storage device 120. In some embodiments, the electronic device 100 may be a computing system, which may be configured to process or store a variety of information. Some examples of such computing systems include a personal computer (PC), a notebook, a laptop, a server, a workstation, a tablet PC, a smartphone, a digital camera, and a black box.

The host device 110 may control an overall operation of the electronic device 100. The host device 110 may communicate with the storage device 120. For example, the host device 110 may store data in the storage device 120, may read data stored in the storage device 120, and/or may delete data stored in the storage device 120. In some embodiments, the host device 110 may communicate with the storage device 120 in compliance with the universal flash storage (UFS) standard.

The host device 110 may include an application 111, a block allocator 112, a block tracker 113, an identification information manager 114, a mapping table 115, and a lifetime information generator 116. Each of the application 111, the block allocator 112, the block tracker 113, the identification information manager 114, the mapping table 115, and the lifetime information generator 116 may be implemented in hardware, software, or a combination thereof.

Functions of at least some of the application 111, the block allocator 112, the block tracker 113, the identification information manager 114, the mapping table 115, and/or the lifetime information generator 116 may be implemented in software. The functions implemented in software may be stored in a non-transitory computer-readable medium as one or more instructions. A processor of the host device 110 may execute instructions stored in the non-transitory computer-readable medium, such that the host device 110 performs functions corresponding to the instructions.

The application 111 may initiate a system operation under control of the user. For example, the application 111 may provide a system request to a file system. The write operation, the read operation, and/or the delete operation may be initiated depending on the system request of the application 111.

The block allocator 112 may allocate a write request block under control of the application 111. The write request block may refer to a data block corresponding to the write operation of the system request. The write request block may include a plurality of data. Each of the plurality of data may be also referred to as a "data chunk." The size of the data chunk may be determined depending on a request of the user or the application 111 or an operating policy of the file system. Each of the plurality of data may have a logical block address (LBA). The host device 110 may access the data by using the logical block address. That is, the data may have one logical block address and may be or may be within a data chunk of a minimum unit accessible by the host device 110.

The block tracker 113 may track block allocation of the block allocator 112 and may control the identification information manager 114, the mapping table 115, and the lifetime information generator 116. For example, the block tracker 113 may track block generation, block change, and/or block deletion by the block allocator 112 and may control at least one of the identification information manager 114, the mapping table 115, and the lifetime information generator 116.

The identification information manager 114 may be under control of the block tracker 113 and may assign identification information for each data chunk. For example, the block tracker 113 may track the write request block generated by the block allocator 112. The write request block may include a plurality of data. Under control of the block tracker 113, the identification information manager 114 may divide the write request block into a plurality of data and may generate a plurality of identification information respectively corresponding to the plurality of data. The identification information may refer to unique information that distinguishes one data from another data. The identification information manager 114 may provide the identification information to the block tracker 113.

The mapping table 115 may manage pairs of a plurality of identification information and a plurality of logical block addresses, with the managed pairs indicative of a relationship or association between a logical block address and a respective identification information. For example, under control of the block tracker 113, the mapping table 115 may store a pair of identification information and a logical block address. The mapping table 115 may be referenced by the block tracker 113.

In greater detail, when the application 111 initiates the write operation of new data, the block tracker 113 may check that identification information is not registered at the mapping table 115 and may store a pair of identification information and a logical block address in the mapping table 115. When the application 111 changes a logical block address of the previously stored data, the block tracker 113 may search the mapping table 115 based on identification information and may update a previous logical block address corresponding to the identification information with a new logical block address. When the application 111 deletes the previously stored data, the block tracker 113 may search the mapping table 115 based on the identification information and may delete a pair of the identification information and the logical block address.

The lifetime information generator 116 may monitor an average data input/output (I/O) frequency for each file. The data I/O frequency may include information about a time point where the write request of specific data is issued and a time point where the delete request of the specific data is issued. The lifetime information generator 116 may be under control of the block tracker 113 and may generate lifetime information. The lifetime information may indicate a predicted time period from a time point where data are generated to a time point where the data are deleted. The lifetime information may be calculated based on an average data I/O frequency of a plurality of data that are managed by the host device 110.

In some embodiments, the lifetime of data may have a tendency. For example, the data may be generated or deleted in compliance with an operating policy of a file. Actual lifetimes (e.g., a time period from a time point where data are actually generated to a time point where the data are actually deleted) of a plurality of data associated with the same file may be similar to each other. The lifetime predicted based on an average data I/O frequency for each file may be similar to the actual lifetime of data.

The storage device 120 may communicate with the host device 110. The storage device 120 may store data from the host device 110, may provide the stored data to the host device 110, or may delete the stored data in response to a request of the host device 110.

The storage device 120 may include a non-volatile memory device 121, a lifetime information updater 122, and a history table 123. The lifetime information updater 122 and the history table 123 may be implemented in hardware, software, or a combination thereof.

The non-volatile memory device 121 may store data. For example, the non-volatile memory device 121 may retain data stored therein even when a power is turned off and may be implemented with a flash memory device, a phase-change RAM (PRAM), a magnetic RAM (MRAM), a resistive RAM (RRAM), etc.

The non-volatile memory device 121 may include a plurality of physical blocks PBK1 to PBKM. Herein, "M" is an arbitrary natural number. Each of the plurality of physical blocks PBK1 to PBKM may store a plurality of data. For example, the first physical block PBK1 may store first to N-th data DT11 to DT1N, and the M-th physical block PBKM may store first to N-th data DTM1 to DTMN.

In some embodiments, in the non-volatile memory device 121, a data size for the delete operation may be larger than a data size for the write operation. For example, in the case of performing a physical write operation of the first data DT11 in the first physical block PBK1 of the non-volatile memory device 121, it may be possible to store physically only the first data DT11 without storing the second data DT12 (e.g., without having to store the second data DT12 during the same write operation). In some embodiments, in the case of performing a physical erase operation (e.g., an operation of changing threshold voltages of memory cells from a programming state to an erase state) of the first physical block PBK1 of the non-volatile memory device 121, all of the first to N-th data DT11 to DT1N may be physically erased, and as such it may not be possible to erase physically only the first data DT11 while also maintaining the second data DT12.

In the case of performing the physical erase operation of the physical block including both valid data and invalid data (e.g., data that are not yet physically erased even though a mapping relationship of a logical block address and a physical block address (PBA) of the data is released through the delete operation), there may be a need to back up (or store) the valid data in another (e.g., any other) physical block. The backup operation of the valid data from the physical block to be erased may cause an increase in the number of program/erase (P/E) cycles of the non-volatile memory device 121, an increase in power consumption, and a delay of a data processing speed.

Accordingly, to minimize the coexistence of valid data and invalid data and to suppress unnecessary backup operations, a technique for integrally managing a plurality of data having similar lifetimes (e.g., an each of the lengths of the lifetimes are similar to each other) is provided herein.

Depending on a request of the host device 110, the lifetime information updater 122 may update the history table 123 such that the lifetime information of the history table 123 inherits previous lifetime information. The inheritance of the lifetime information will be described in greater detail with reference to FIGS. 2 and 3.

The history table 123 may store and/or manage pairs of a plurality of logical block addresses and a plurality of lifetime information. For example, the history table 123 may store a pair of a logical block address and lifetime information received from the host device 110. Under control of the lifetime information updater 122, the history table 123 may store a pair of a logical block address and lifetime information inheriting previous lifetime information. The history table 123 may delete a pair of a logical block address and lifetime information depending on a request from the host device 110.

Figure 2:
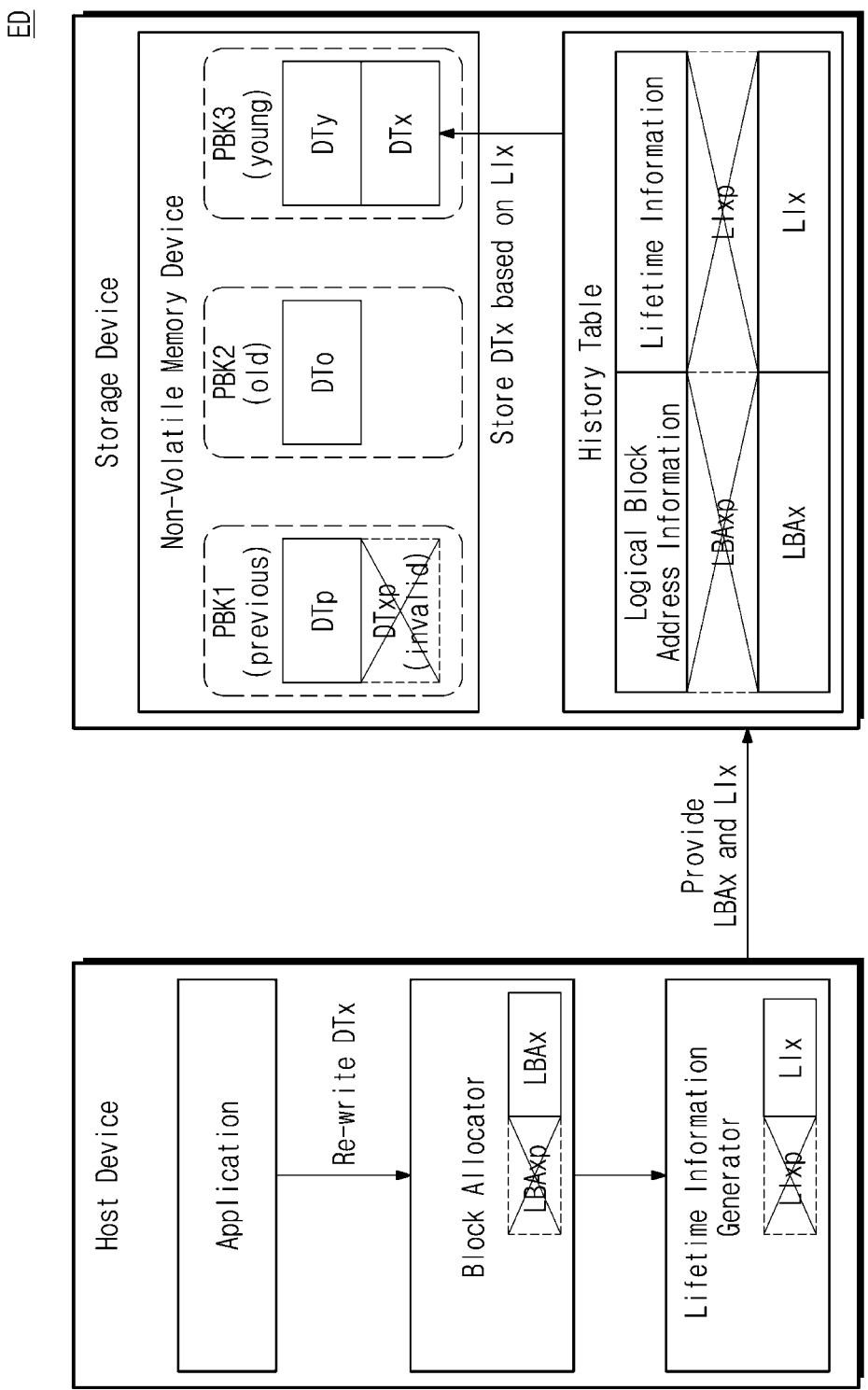
FIG. 2 describes management of lifetime information of a conventional electronic device.

FIG. 2 describes management of lifetime information of a conventional electronic device. Referring to FIG. 2, a conventional electronic device ED may include a host device and a storage device. For better understanding of the present disclosure, components and operations of the conventional electronic device ED will be described, but the conventional electronic device ED may include technical features not disclosed in documents of the information disclosure statement and is not intended to limit the scope and spirit of the inventive concepts provided herein.

The host device may include an application, a block allocator, and a lifetime information generator. The storage device may include a non-volatile memory device and a history table.

The non-volatile memory device may include a first physical block PBK1, a second physical block PBK2, and a third physical block PBK3. The first physical block PBK1 may be a memory block used in the write operation of previous target data DTxp. The first physical block PBK1 may store data DTp and the previous target data DTxp. The second physical block PBK2 may be a memory block managing relatively old data. For example, the second physical block PBK2 may store data DTo. A delete time point of the data DTo predicted based on corresponding lifetime information may be relatively short. The third physical block PBK3 may be a memory block managing relatively young data. For example, the third physical block PBK3 may store data DTy. A delete time point of the data DTy predicted based on corresponding lifetime information may be relatively long.

The application may perform re-write of target data DTx. For example, the content of the target data DTx may be the same as the content of the previous target data DTxp stored in the first physical block PBK1. That is, the application may initiate a re-write operation of data of the same content and a changed logical block address.

The block allocator may determine a target logical block address LBAx corresponding to the previous target data DTxp under control of the application. Before determining the target logical block address LBAx, the block allocator may determine a previous target logical block address LBAxp corresponding to the previous target data DTxp. As the re-write operation is performed, the previous target data DTxp and the previous target logical block address LBAxp may be invalidated.

The lifetime information generator may generate target lifetime information LIx corresponding to the target logical block address LBAx under control of the block allocator. The lifetime information generator may provide the storage device with a request for registration of lifetime information. For example, the request for registration of lifetime information may include the target logical block address LBAx and the target lifetime information LIx.

Before generating the target lifetime information LIx, the lifetime information generator may generate previous lifetime information LIxp corresponding to the previous target logical block address LBAxp. Because the content of the target data DTx is the same as the content of the previous target data DTxp, the target data DTx may follow the tendency of data generated in the write operation of the previous target data DTxp. That is, it may be appropriate to predict a delete time point of the target data DTx based on the previous lifetime information LIxp instead of the target lifetime information LIx.

The history table may receive the target logical block address LBAx and the target lifetime information LIx from the host device. The history table may invalidate the previous target logical block address LBAxp and the previous lifetime information LIxp. The storage device may store the target data DTx in the third physical block PBK3, based on the target lifetime information LIx of the history table.

That is, the history table of the conventional electronic device ED may manage lifetime information based on a logical block address. The history table may fail to recognize a change of a logical block address of the same data. As such, the accuracy of the delete time point predicted based on lifetime information may decrease.

For example, because the target data DTx are substantially the same as the previous target data DTxp, the delete time point of the target data DTx may be similar to the delete time point of the data DTo. It may be appropriate to store the target data DTx in the second physical block PBK2 together with the data DTo. However, the delete time point of the target data DTx may be differently predicted based on the target lifetime information LIx, and the target data DTx may be stored in the third physical block PBK3. As such, the efficiency of garbage collection may decrease, a write amplification factor WAF may increase, and the number of P/E cycles of the storage device may increase.

The garbage collection may be a memory management technique for releasing allocation of an unnecessary memory region among allocated memory regions. The garbage collection will be described in greater detail with reference to FIG. 4.

The write amplification factor WAF may be a numerical value representing the amount of data the storage device writes in relation to the amount of data the host device writes. For example, the numerical value of the write amplification factor WAF may be obtained by dividing a byte value of data the storage device writes by a byte value of data the host writes. The value of the write amplification factor WAF is greater than or equal to "1". As the value of the write amplification factor WAF becomes greater, inefficient data movement, copy, or write may increase.

As described above, the storage device of the conventional electronic device ED may manage lifetime information based on a logical block address. When the storage device fails to recognize the change of the logical block address of the same data, the accuracy of the lifetime information may decrease. A method of improving the accuracy of lifetime information will be described in greater detail with reference to FIG. 3.

Figure 3:
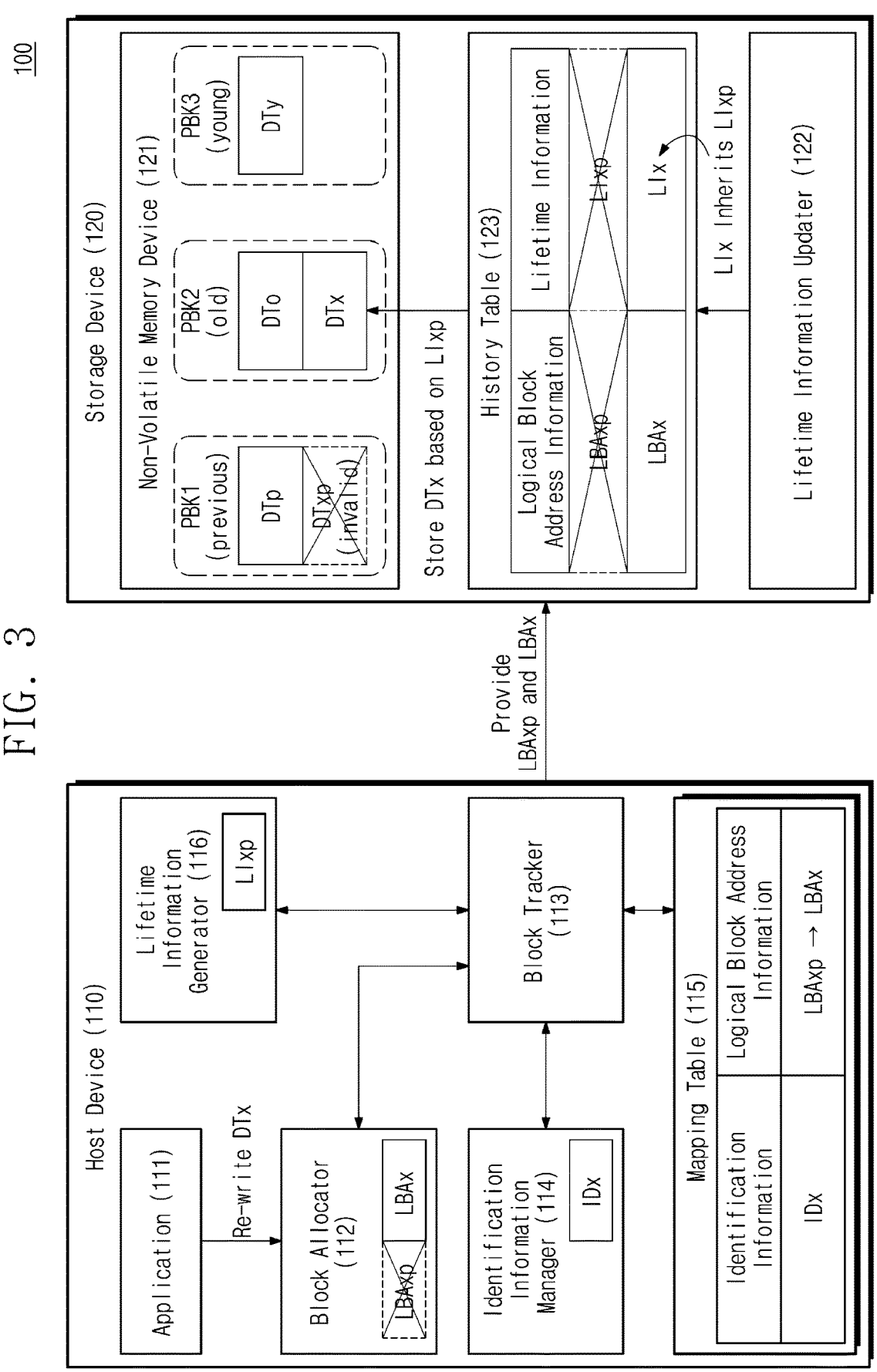
FIG. 3 describes management of lifetime information according to some embodiments of the present disclosure.

FIG. 3 describes management of lifetime information according to some embodiments of the present disclosure. Referring to FIG. 3, the electronic device 100 may include the host device 110 and the storage device 120. The host device 110 may include the application 111, the block allocator 112, the block tracker 113, the identification information manager 114, the mapping table 115, and the lifetime information generator 116. The storage device 120 may include the non-volatile memory device 121, the lifetime information updater 122, and the history table 123.

The non-volatile memory device 121 may include the first physical block PBK1, the second physical block PBK2, and the third physical block PBK3. The first physical block PBK1 may be a memory block used in the write operation of the previous target data DTxp. The second physical block PBK2 may be a memory block managing relatively old data. The second physical block PBK2 may store the data DTo. The third physical block PBK3 may be a memory block managing relatively young data. The third physical block PBK3 may store the data DTy.

The application 111 may perform re-write of the target data DTx. The content of the target data DTx may be the same as the content of the previous target data DTxp stored in the first physical block PBK1. That is, the application 111 may initiate the re-write operation of the data of the same content and the changed logical block address.

In some embodiments, the host device 110 may perform the re-write operation of the data of the same content in compliance with the operating policy. For example, the host device 110 may support a log-structured file system. The application 111 may initiate the re-write operation on the data of the same content for an overwrite operation or a segment cleaning operation of the log-structured file system.

As another example, the application 111 may initiate the re-write operation on the data of the same content for a de-fragmentation operation of the file system.

As another example, the host device 110 may support object based storage. The application 111 may initiate the re-write operation on the data of the same content for an object update operation of the object based storage.

The block allocator 112 may determine the target logical block address LBAx corresponding to the target data DTx under control of the application 111. Before determining the target logical block address LBAx, the block allocator 112 may determine the previous target logical block address LBAxp corresponding to the previous target data DTxp. As the re-write operation is performed, the previous target data DTxp and the previous target logical block address LBAxp may be invalidated.

The block tracker 113 may track block allocation of the block allocator 112 and may control the identification information manager 114, the mapping table 115, and the lifetime information generator 116.

The identification information manager 114 may assign identification information for each data chunk, under control of the block tracker 113. For example, the identification information manager 114 may generate target identification information IDx corresponding to the target data DTx. The target identification information IDx may further correspond to the previous target data DTxp. That is, that the content of the target data DTx is the same as the content of the previous target data DTxp may be determined based on the target identification information IDx. The identification information manager 114 may provide the target identification information IDx to the block tracker 113.

The mapping table 115 may store a pair of identification information and logical block address information. The block tracker 113 may search the mapping table 115 based on the target identification information IDx and may update the mapping table 115 such that the previous target logical block address LBAxp is changed to the target logical block address LBAx. After updating the mapping table 115, the block tracker 113 may provide the storage device 120 with a request for inheritance of lifetime information. The request for inheritance of lifetime information may include the previous target logical block address LBAxp and the target logical block address LBAx.

The lifetime information generator 116 may generate lifetime information under control of the block tracker 113. For example, in the write operation of the previous target data DTxp, when the target identification information IDx are not found in the mapping table 115, the block tracker 113 may request the lifetime information generator 116 to generate the previous lifetime information LIxp. As another example, in the re-write operation of the target data DTx, when the target identification information IDx are found in the mapping table 115, the block tracker 113 may not request the lifetime information generator 116 to generate the previous lifetime information LIxp separately.

The lifetime information updater 122 may receive the request for inheritance of lifetime information from the block tracker 113. The lifetime information updater 122 may generate the target lifetime information LIx inheriting the previous lifetime information LIxp. For example, a value of the target lifetime information LIx may be the same as a value of the previous lifetime information LIxp. The lifetime information updater 122 may store a pair of the target logical block address LBAx and the target lifetime information LIx in the history table 123.

The storage device 120 may store the target data DTx in the second physical block PBK2, based on the target lifetime information LIx inheriting the previous lifetime information LIxp of the history table 123. The previous lifetime information LIxp that is information generated in the write operation of the previous target data DTxp may be used to predict more accurately the delete time point of the target data DTx.

That is, the electronic device 100 according to some embodiments of the present disclosure may manage data with the same identification information such that lifetime information inherits previous lifetime information. Based on a request for inheritance of previous lifetime information received from the block tracker 113, the lifetime information updater 122 may recognize the change of the logical block address of the same data and may update the history table 123 such that the lifetime information inherits the previous lifetime information. As such, the accuracy of the delete time point predicted based on the lifetime information may increase.

For example, because the target data DTx are substantially the same as the previous target data DTxp, the delete time point of the target data DTx may be similar to the delete time point of the data DTo. It may be appropriate to store the target data DTx in the second physical block PBK2 together with the data DTo. Because the target lifetime information LIx inherits the previous lifetime information LIxp, the delete time point may be predicted to be similar to the delete time point of the previous target data DTxp or the data DTo. The target data DTx may be stored in the second physical block PBK2. Accordingly, as compared to the case where the target data DTx are stored in the third physical block PBK3 (e.g., the example of FIG. 2), the efficiency of garbage collection may be improved, the write amplification factor WAF may decrease, and the number of P/E cycles of the storage device 120 of the present disclosure may decrease.

Figure 4:
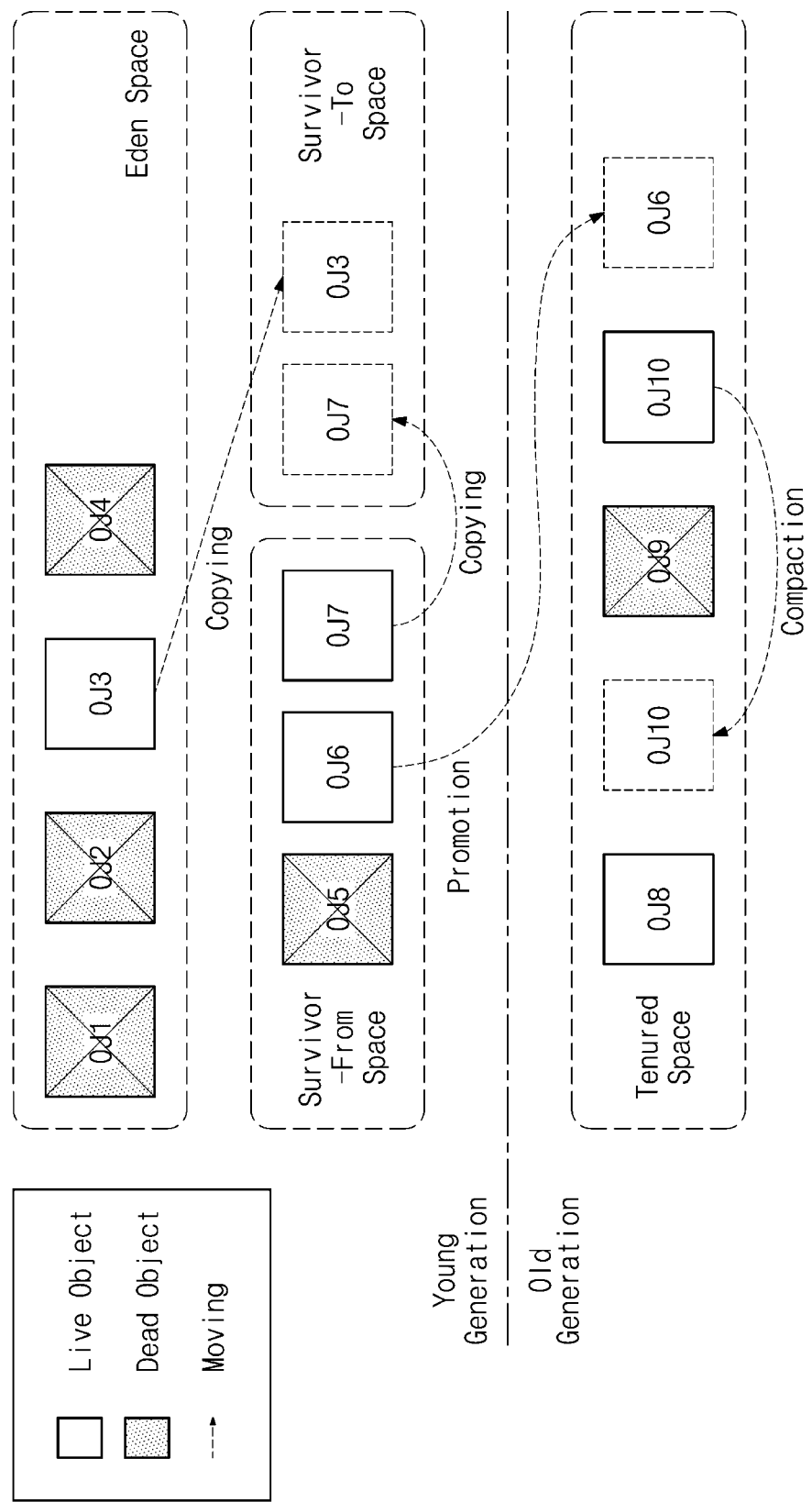
FIG. 4 describes a garbage collection operation according to some embodiments of the present disclosure.

FIG. 4 describes a garbage collection operation according to some embodiments of the present disclosure. A garbage collection operation will be described with reference to FIGS. 1 and 4. The garbage collection operation may refer to an operation of deallocating a portion of a dynamically allocated memory space that is not used any more. The memory space may be referred to as an "object" and may correspond to data or a data set of each of the physical blocks PBK1 to PBKM of the non-volatile memory device 121 of FIG. 1.

The non-volatile memory device 121 may include a heap space and a root set for managing objects. The heap space may include a young generation and an old generation. The young generation may include an Eden space, a Survivor-From space, and a Survivor-To space. The old generation may include a tenured space. A live object is shown in white, and a dead object is shown in shade. That an object is alive may mean that data are valid or are referenced by any other object. That an object is dead may mean that data are invalid or are not referenced by any other object. A dashed line arrow may mean a movement of an object.

The storage device 120 may perform the garbage collection operation on objects stored in the non-volatile memory device 121. The Eden space may include first to fourth objects OJ1, OJ2, OJ3, and OJ4 received from the root set. The storage device 120 may copy the third object OJ3 that is alive from among the first to fourth objects OJ1, OJ2, OJ3, and OJ4 to the Survivor-To space. After copying the third object OJ3, the storage device 120 may deallocate all objects of the Eden space.

The Survivor-From space may include fifth to seventh objects OJ5, OJ6, and OJ7. The storage device 120 may determine that the sixth and seventh objects OJ6 and OJ7 are alive and may increase the live number of times for each of the sixth and seventh objects OJ6 and OJ7. The live number of times of the sixth object OJ6 may exceed a threshold value. The storage device 120 may promote the sixth object OJ6 to the tenured space. The live number of times of the seventh object OJ7 may not exceed the threshold value. The storage device 120 may copy the seventh object OJ7 to the Survivor-To space. The storage device 120 may copy or promote live objects of the Survivor-From space and may then deallocate all objects of the Survivor-From space.

In some embodiments, the storage device 120 may perform garbage collection based on inherited lifetime information. For example, with regard to data having the same identification information, the lifetime information updater 122 may generate lifetime information inheriting the live number of times of previous lifetime information. The storage device 120 may determine whether target data are alive, in the garbage collection operation. In response to determining that the target data are alive, the storage device 120 may promote the target data to the tenured space based on the live number of times inherited from the previous lifetime information.

The movement of the object may be more accurately managed by keeping the live number of times before the change of the logical block address with regard to the same data. As such, the number of invalid pages (e.g., the number of dead objects) in a victim block (e.g., the Eden space or the Survivor-From space) of the garbage collection operation may decrease, and the write amplification factor WAF of the electronic device 100 may decrease.

The Survivor-To space may receive the third object OJ3 from the Eden space. The Survivor-To space may receive the seventh object OJ7 from the Survivor-From space. The Survivor-To space may be used as the Survivor-From space in a next garbage collection operation. The Survivor-From space may be used as the Survivor-To space in the next garbage collection operation.

The tenured space may include eighth to tenth objects OJ8, OJ9, and OJ10. The tenured space may receive the sixth object OJ6 from the Survivor-From space. The storage device 120 may perform compaction of the tenth object OJ10. The compaction may be to move a live object in the old generation space so as to be close to another live object. The compaction may reduce the fragmentation of the memory space.

As described above, the garbage collection operation of the storage device 120 is described with reference to FIGS. 1 to 4. The garbage collection may include moving data (or an object) depending on a generation time point or a lifetime of the data. As lifetime information of the same object is inherited through the lifetime information updater 122, the efficiency and accuracy of the garbage collection operation may be improved, and unnecessary data movement (e.g., a data copy due to an incorrectly predicted lifetime) may decrease.

Figure 5:
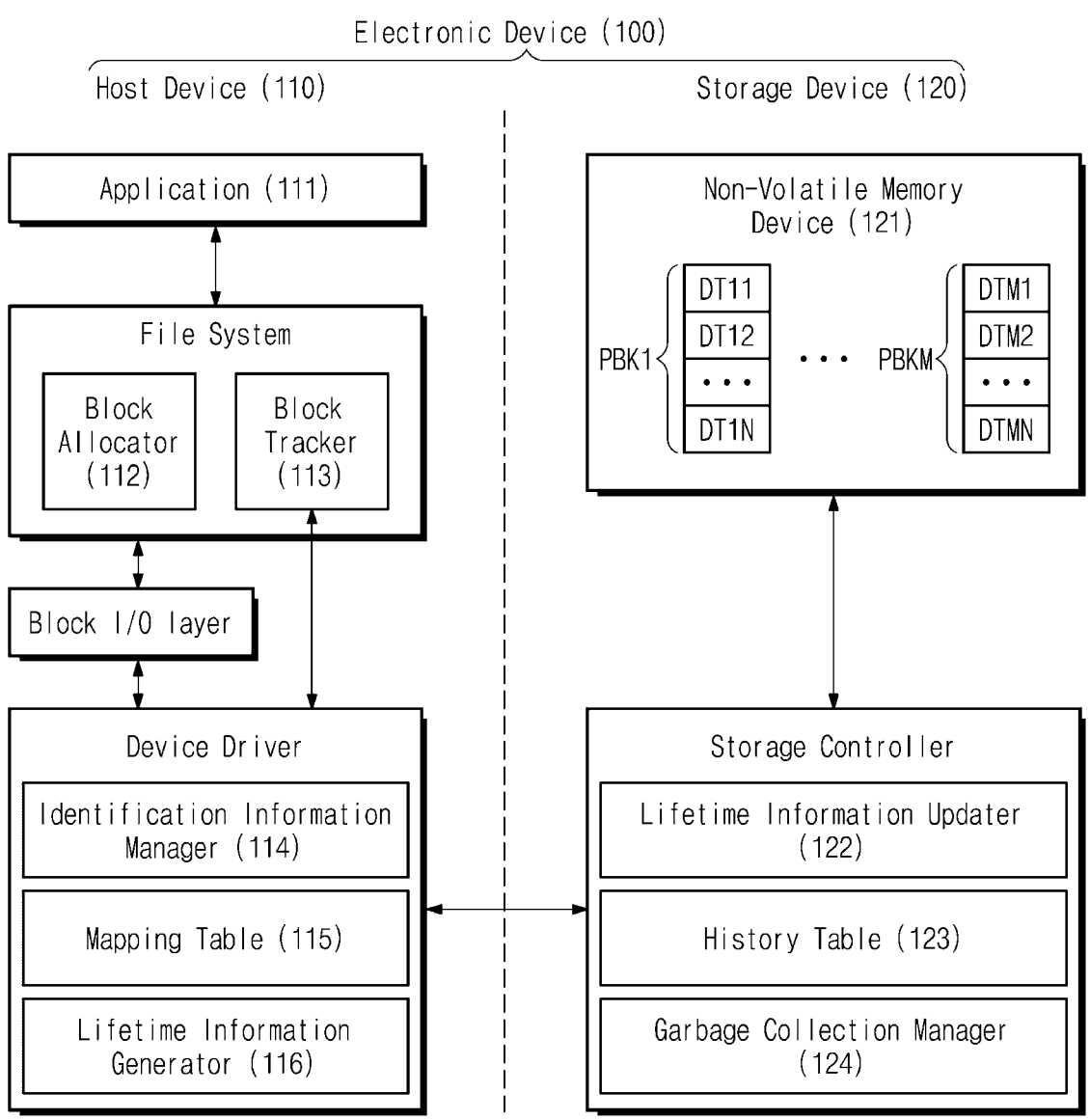
FIG. 5 is a block diagram of an electronic device according to some embodiments of the present disclosure.

FIG. 5 is a block diagram of an electronic device according to some embodiments of the present disclosure. Referring to FIG. 5, the electronic device 100 may include the host device 110 and the storage device 120. The host device 110 may include the application 111, a file system, a block I/O layer, and a device driver. The file system may include the block allocator 112 and the block tracker 113. The device driver may include the identification information manager 114, the mapping table 115, and the lifetime information generator 116.

The file system may manage a file in response to a system request of the application 111. For example, the file system may generate a file, may change the file, or may delete the file.

The block I/O layer may schedule an input and an output of a data chunk between the file system and the device driver. The file system may indirectly access the device driver through the block I/O layer or the file system may directly access the device driver.

The device driver may support an interface between the host device 110 and the storage device 120. The device driver may translate a request from the file system or the block I/O layer so as to be provided to the storage device 120. The device driver may translate a response or data from the storage device 120 so as to be provided to the file system.

The file system, the block I/O layer, and the device driver may be also referred to as an "operating system (OS) kernel."

The storage device 120 may include the non-volatile memory device 121 and a storage controller. Under control of the storage controller, the non-volatile memory device 121 may store data in the plurality of physical blocks PBK1 to PBKM, may read the stored data, and/or may delete the stored data. The storage controller may include the lifetime information updater 122, the history table 123, and a garbage collection manager 124. The garbage collection manager 124 may perform the garbage collection operation on data or on an object stored in the non-volatile memory device 121 with reference to the lifetime information of the history table 123.

As described above, the host device 110 may include the application 111, the file system, and the device driver. The block allocator 112 and the block tracker 113 may be implemented on the file system. The identification information manager 114, the mapping table 115, and the lifetime information generator 116 may be implemented on the device driver.

Figure 6:
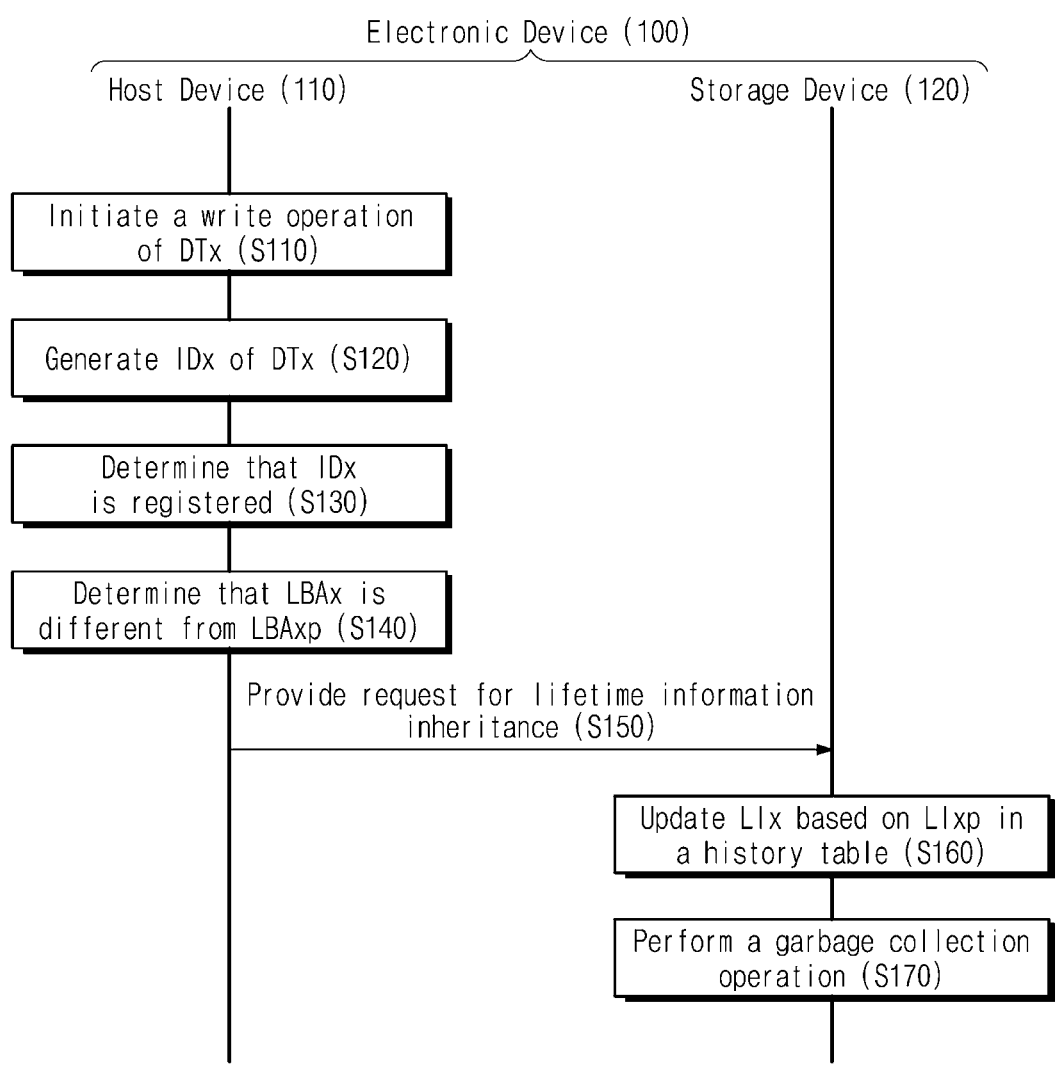
FIG. 6 is a flowchart describing a method of operating an electronic device according to some embodiments of the present disclosure.

FIG. 6 is a flowchart describing a method of operating an electronic device according to some embodiments of the present disclosure. Referring to FIG. 6, the electronic device 100 may include the host device 110 and the storage device 120. The host device 110 may include a mapping table. The storage device 120 may include a history table.

In operation S110, the host device 110 may initiate the write operation of the target data DTx. The target data DTx may correspond to the target logical block address LBAx of the allocated write request block. For example, the host device 110 may include an application. The host device 110 may allocate a write request block depending on a request for system write of the application. The write request block may include a plurality of data chunks. The target data DTx may be one of the plurality of data chunks.

In operation S120, the host device 110 may generate the target identification information IDx of the target data DTx. The target identification information IDx may refer to unique information that distinguishes the target data DTx from any other data (or data chunk). When pieces of data include the same content, the pieces of data may have the same identification information.

In operation S130, the host device 110 may determine that the target identification information IDx is registered at the mapping table. For example, the host device 110 may initiate the write operation of data whose content is the same as that of the target data DTx before operation S110 and may store the target identification information IDx corresponding to the target data DTx in the mapping table. The host device 110 may determine that the target identification information IDx in operation S120 is the same as the target identification information IDx stored in the mapping table in the previous write operation. That is, the write operation initiated in operation S110 may be the re-write operation.

In operation S140, the host device 110 may determine that the target logical block address LBAx is different from the previous target logical block address LBAxp in the mapping table. For example, the host device 110 may allocate the previous target logical block address LBAxp to data whose content is the same as that of the target data DTx before operation S110 and may store a pair of the target identification information IDx and the previous target logical block address LBAxp in the mapping table. The host device 110 may search the mapping table for the previous target logical block address LBAxp based on the target identification information IDx and may determine that the previous target logical block address LBAxp is different from the target logical block address LBAx allocated to the target data DTx in operation S110.

In operation S150, the host device 110 may provide the storage device 120 with a request for inheritance of lifetime information. For example, the host device 110 may provide the storage device 120 with a request for inheritance of the previous lifetime information LIxp corresponding to data whose content is the same as that of the target data DTx before operation S110.

In some embodiments, the request in operation S150 may include the previous target logical block address LBAxp, the target logical block address LBAx, and the size of the target data DTx. For example, the previous target logical block address LBAxp may be allocated in the previous write operation of data whose content is the same as that of the target data DTx. The target logical block address LBAx may be allocated in operation S110. The size of the target data DTx may indicate the size of the data chunk.

In operation S160, the storage device 120 may update the target lifetime information LIx based on the previous lifetime information LIxp in the history table. For example, the storage device 120 may store a pair of the previous target logical block address LBAxp and the previous lifetime information LIxp based on the previous write operation of data whose content is the same as that of the target data DTx before operation S110. Based on the request in operation S150, the storage device 120 may search for the previous lifetime information LIxp, may generate the target lifetime information LIx inheriting the previous lifetime information LIxp, and may store a pair of the target logical block address LBAx and the target lifetime information LIx in the history table.

In operation S170, the storage device 120 may perform the garbage collection operation. For example, the storage device 120 may perform the garbage collection operation of the target data DTx based on the target lifetime information LIx inheriting the previous lifetime information LIxp of operation S160. Because the target lifetime information LIx inherits the previous lifetime information LIxp, even though the logical block address is changed, the accuracy of the predicted delete time point of the target data DTx may be improved.

Figure 7:
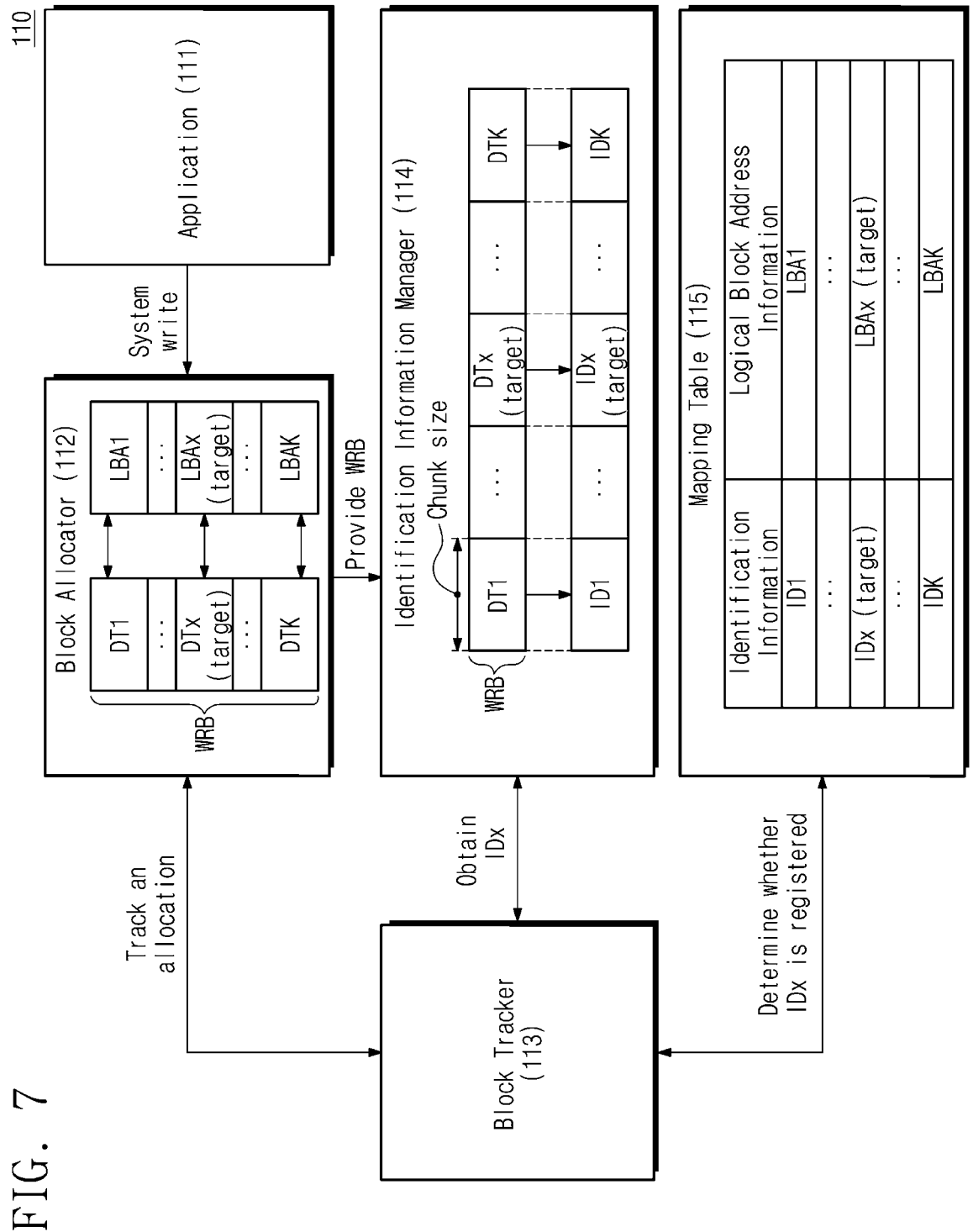
FIG. 7 is a block diagram of a host device according to some embodiments of the present disclosure.

FIG. 7 is a block diagram of a host device according to some embodiments of the present disclosure. Referring to FIG. 7, the host device 110 may include the application 111, the block allocator 112, the block tracker 113, the identification information manager 114, and the mapping table 115.

The application 111 may provide the block allocator 112 with a request for system write. The block allocator 112 may allocate a write request block WRB based on the request of the application 111. The write request block WRB may include first to K-th data DT1 to DTK. Herein, "K" is an arbitrary natural number. One of the first to K-th data DT1 to DTK may be the target data DTx. The first to K-th data DT1 to DTK may respectively correspond first to K-th logical block addresses LBA1 to LBAK. That is, the block allocator 112 may allocate a logical block address for each data chunk of the write request block WRB. The block allocator 112 may provide the write request block WRB to the identification information manager 114.

The block tracker 113 may track block allocation of the block allocator 112, may request that the identification information manager 114 generate identification information, and may determine whether the identification information obtained from the identification information manager 114 is registered at the mapping table.

The identification information manager 114 may divide the write request block WRB into the plurality of data DT1 to DTK under control of the block tracker 113. Each of the plurality of data DT1 to DTK may have the size of the data chunk. The identification information manager 114 may generate a plurality of identification information ID1 to IDK respectively corresponding to the plurality of data DT1 to DTK. One of the plurality of identification information ID1 to IDK may be the target identification information IDx. The target identification information IDx may correspond to the target data DTx. That is, the identification information manager 114 may assign identification information for each data chunk.

In some embodiments, the identification information manager 114 may generate the target identification information IDx by combining an inode number and a file offset. For example, the block allocator 112 may allocate an inode block including the target data DTx under control of the application 111. Each of a plurality of data in the inode block may have a file offset. The file offset may indicate a position of current data from a start point of a file by using an integer format. The identification information manager 114 may receive the inode block including the target data DTx from the block allocator 112. The identification information manager 114 may generate the target identification information IDx by combining the inode number of the inode block and the file offset of the target data DTx.

In some embodiments, the identification information manager 114 may generate the target identification information IDx based on a hash function. For example, the identification information manager 114 may generate the plurality of identification information ID1 to IDK by dividing the write request block WRB into the plurality of data DT1 to DTK and applying the hash function to each of the plurality of data DT1 to DTK.

In some embodiments, the host device 110 may generate target identification information by using the file system. For example, in contrast to the description given with reference to FIG. 5, the identification information manager 114 may be implemented on the file system instead of the device driver. The host device 110 may generate the plurality of identification information ID1 to IDK respectively corresponding to the plurality of data DT1 to DTK, by using an internal policy of the identification information manager 114 of the file system or a separate module.

The mapping table 115 may store pairs of the plurality of identification information ID1 to IDK and the plurality of logical block addresses LBA1 to LBAK. When the application 111 writes the target data DTx for the first time, the block tracker 113 may determine that the target identification information IDx is not registered and may store a pair of the target identification information IDx and the target logical block address LBAx in the mapping table 115. When the application 111 re-writes the target data DTx, the block tracker 113 may determine that the target identification information IDx is registered and may update the mapping table 115 such that previous target logical block address corresponding to the target identification information IDx is changed to the target logical block address LBAx (e.g., a present target logical block address corresponding to the target identification information IDx).

Figure 8:
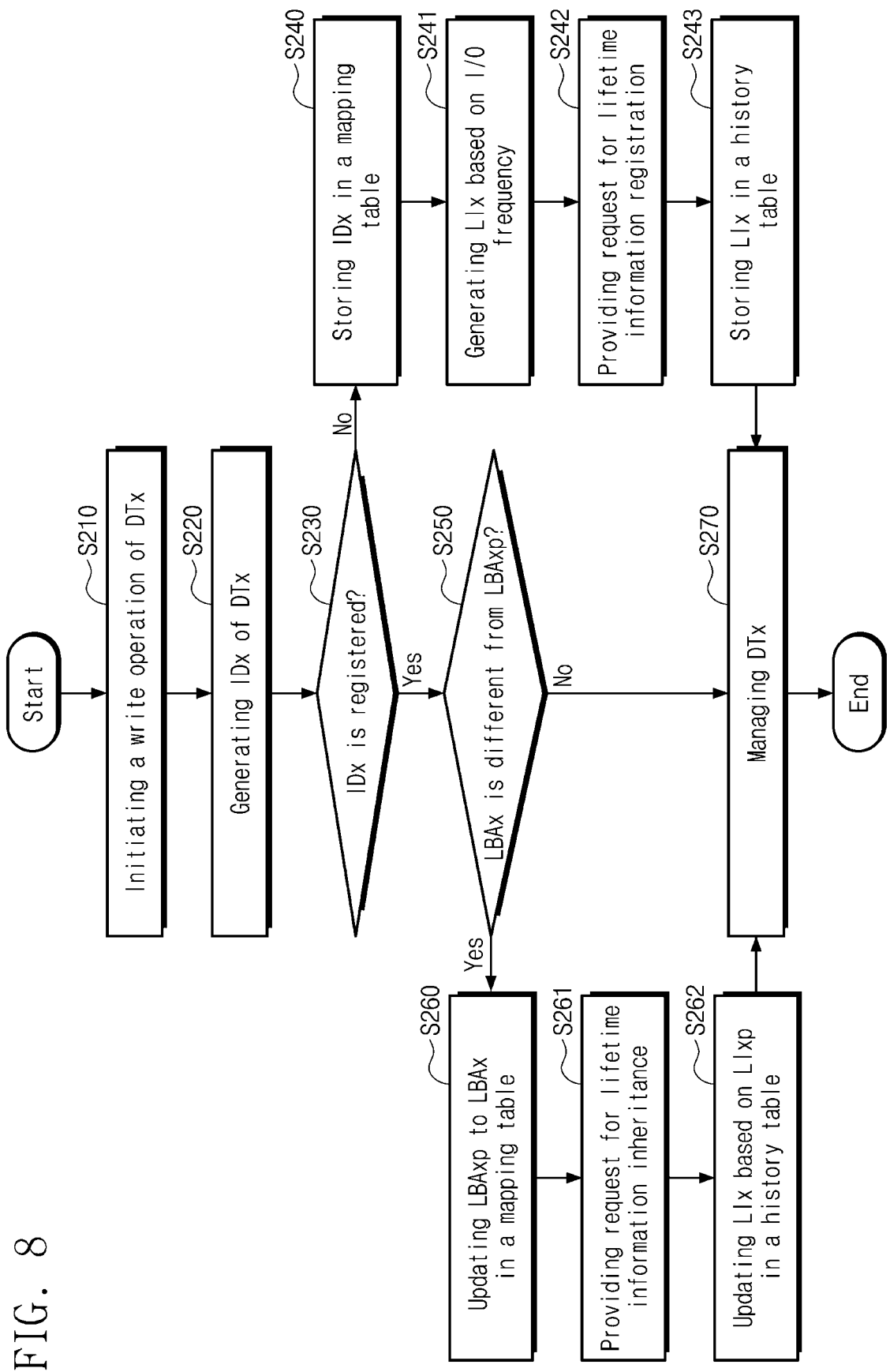
FIG. 8 is a flowchart describing a write operation of an electronic device according to some embodiments of the present disclosure.

FIG. 8 is a flowchart describing a write operation of an electronic device according to some embodiments of the present disclosure. Referring to FIG. 8, an electronic device may include a host device and a storage device. The host device may include a mapping table. The storage device may a history table.

In operation S210, the host device may initiate the write operation of the target data DTx. The host device may allocate the target logical block address LBAx corresponding to the target data DTx. In operation S220, the host device may generate the target identification information IDx of the target data DTx.

In operation S230, the host device may determine whether the target identification information IDx is registered at the mapping table. When it is determined that the target identification information IDx is not registered at the mapping table ("No" branch from operation S230), the electronic device may perform operation S240. When it is determined that the target identification information IDx is registered at the mapping table ("Yes" branch from operation S230), the electronic device may perform operation S250.

In operation S240, the host device may store the target identification information IDx in the mapping table. For example, the host device may store a pair of the target identification information IDx and the target logical block address LBAx in the mapping table. In operation S241, the host device may generate the target lifetime information LIx based on an average data I/O frequency. In operation S242, the host device may provide the storage device with a request for registration of lifetime information. In this case, the request may include the target lifetime information LIx and the target logical block address LBAx. In operation S243, the storage device may store a pair of the target logical block address LBAx and the target lifetime information LIx in the history table.

In operation S250, the host device may determine that the target logical block address LBAx allocated in operation S210 is different from the previous target logical block address LBAxp corresponding to the target data DTx in the mapping table. When it is determined that the target logical block address LBAx is different from the previous target logical block address LBAxp ("Yes" branch from operation S250), the electronic device may perform operation S260. When it is determined that the target logical block address LBAx is not different from the previous target logical block address LBAxp ("No" branch from operation S250), the electronic device may perform operation S270.

In operation S260, the host device may update the mapping table such that the previous target logical block address LBAxp is changed to the target logical block address LBAx. That is, the mapping table may store a pair of the target identification information IDx and the target logical block address LBAx. In operation S261, the host device may provide the storage device with a request for inheritance of lifetime information. In this case, the request may include the previous target logical block address LBAxp, the target logical block address LBAx, and the size of the target data DTx. In operation S262, the storage device may update the target lifetime information LIx based on the previous lifetime information LIxp in the history table. For example, the storage device may search the mapping table for the previous lifetime information LIxp, based on the previous target logical block address LBAxp received from the host device. The storage device may generate the target lifetime information LIx inheriting the previous lifetime information LIxp. The storage device may store a pair of the target logical block address LBAx and the target lifetime information LIx in the history table.

In operation S270, the storage device may manage the target data DTx. Operation S270 may be performed after operation S243, after operation S262, or when it is determined in operation S250 that the target logical block address LBAx is the same as the previous target logical block address LBAxp. The storage device may manage the target data DTx and any other data having similar lifetime information (e.g., being similar in the predicted delete time point) together with reference to the updated target lifetime information LIx in the history table.

In some embodiments, the storage device may perform the garbage collection operation based on the target lifetime information LIx of the history table. For example, in the garbage collection operation the storage device may determine whether the target data DTx are alive; in response to determining that the target data DTx are alive, the storage device may promote the target data DTx to the tenured space based on the target lifetime information LIx including the live number of times inherited from the previous lifetime information LIxp.

Figure 9:
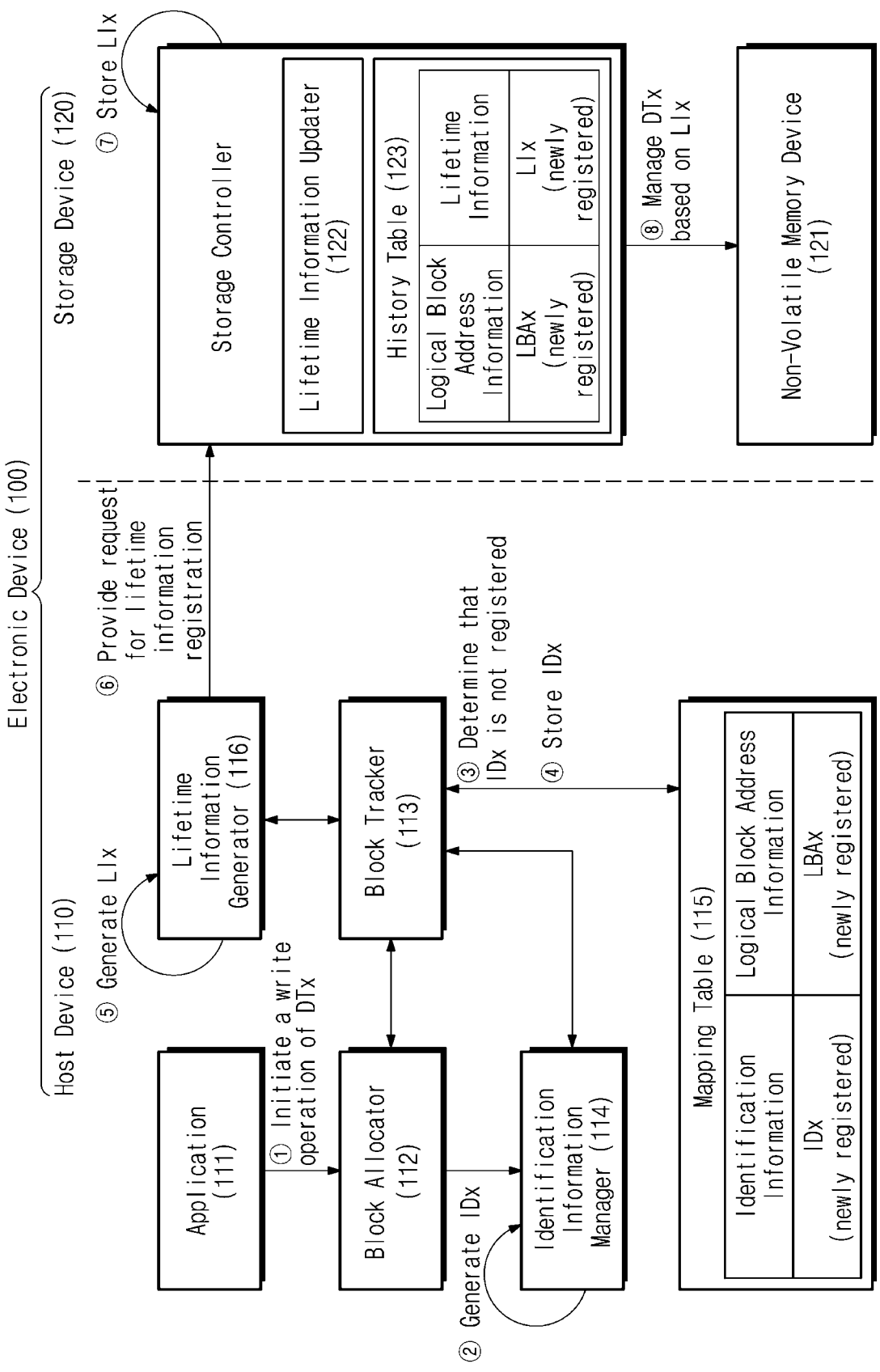
FIG. 9 is a diagram describing a write operation of an electronic device according to some embodiments of the present disclosure.

FIG. 9 is a diagram describing a write operation of an electronic device according to some embodiments of the present disclosure. An operation in which the electronic device 100 writes the target data DTx for the first time will be described with reference to FIG. 9. The embodiment of FIG. 9 may correspond to the case where it is determined in operation S230 of FIG. 8 that the target identification information IDx is not registered.

The electronic device 100 may include the host device 110 and the storage device 120. The host device 110 may include the application 111, the block allocator 112, the block tracker 113, the identification information manager 114, the mapping table 115, and the lifetime information generator 116. The storage device 120 may include the non-volatile memory device 121 and a storage controller. The storage controller may include the lifetime information updater 122 and the history table 123.

Below, an operation in which the electronic device 100 writes the target data DTx for the first time will be described.

In a first operation ①, the application 111 may initiate the write operation of the target data DTx. The block allocator 112 may allocate a write request block under control of the application 111. The write request block may include a plurality of data and a plurality of logical block addresses respectively corresponding to the plurality of data. One of the plurality of data may be the target data DTx, and one of the plurality of logical block addresses may be the target logical block address LBAx corresponding to the target data DTx. The block allocator 112 may provide the write request block to the identification information manager 114. The block tracker 113 may track allocation of the write request block by the block allocator 112, may receive the target logical block address LBAx from the block allocator 112, and may request the identification information manager 114 to generate the target identification information IDx.

In a second operation ②, under control of the block tracker 113, the identification information manager 114 may generate a plurality of identification information corresponding to the plurality of data based on the write request block received from the block allocator 112. For example, the write request block may include the target data DTx, and the identification information manager 114 may generate the target identification information IDx corresponding to the target data DTx. The identification information manager 114 may provide the target identification information IDx to the block tracker 113.

In a third operation ③, the block tracker 113 may search the mapping table 115 for the target identification information IDx and may determine that the target identification information IDx is not registered at the mapping table 115.

In a fourth operation ④, the block tracker 113 may store a pair of the target identification information IDx and the target logical block address LBAx in the mapping table 115. The target identification information IDx and the target logical block address LBAx may be newly registered at the mapping table 115.

In a fifth operation ⑤, the lifetime information generator 116 may generate the target lifetime information LIx corresponding to the target logical block address LBAx under control of the block tracker 113.

In a sixth operation ⑥, the lifetime information generator 116 may provide the storage controller with a request for registration of lifetime information. The request for registration of lifetime information may include the target logical block address LBAx and the target lifetime information LIx.

In a seventh operation ⑦, the lifetime information updater 122 may store a pair of the target logical block address LBAx and the target lifetime information LIx in the history table 123, based on the request from the lifetime information generator 116.

In an eighth operation ⑧, the storage controller may manage the target data DTx based on the target lifetime information LIx stored in the history table 123. For example, the storage controller may store the target data DTx and any other data having similar lifetime information (e.g., having similar predicted delete time points) in the non-volatile memory device 121 together (e.g., so as to be physically adjacent to each other). In some embodiments, the storage controller may perform the garbage collection operation of the target data DTx based on the target lifetime information LIx.

Figure 10:
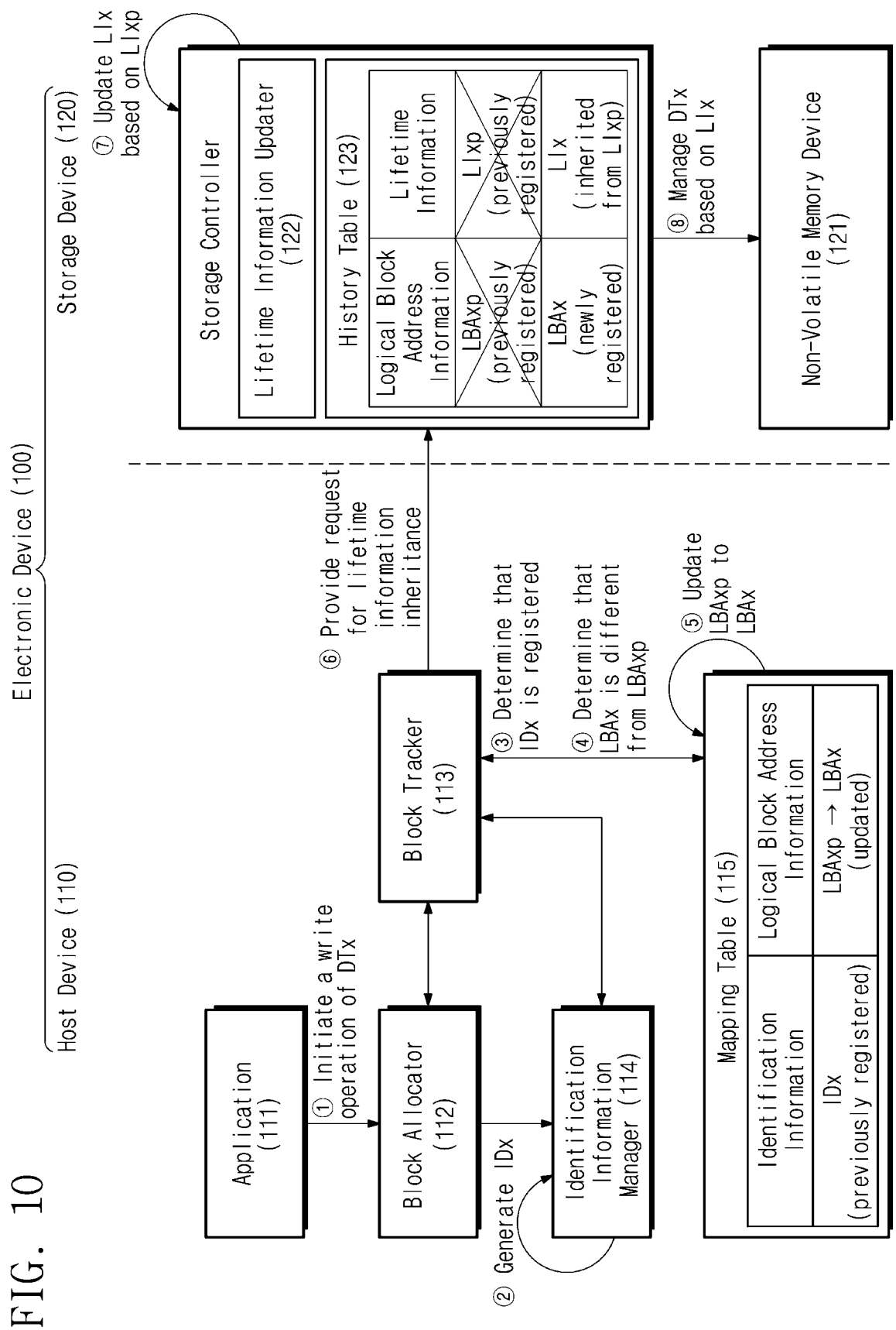
FIG. 10 is a diagram describing a write operation of an electronic device according to some embodiments of the present disclosure.

FIG. 10 is a diagram describing a write operation of an electronic device according to some embodiments of the present disclosure. An operation in which the electronic device 100 performs the re-write operation with regard to the changed logical block address of the target data DTx will be described with reference to FIG. 10. The embodiment of FIG. 10 may correspond to the case where it is determined in operation S250 of FIG. 8 that the target logical block address LBAx is different from the previous target logical block address LBAxp.

The electronic device 100 may include the host device 110 and the storage device 120. The host device 110 may include the application 111, the block allocator 112, the block tracker 113, the identification information manager 114, and the mapping table 115. The storage device 120 may include the non-volatile memory device 121 and a storage controller. The storage controller may include the lifetime information updater 122 and the history table 123.

Below, an operation in which the electronic device 100 performs the re-write operation with regard to the changed logical block address of the target data DTx will be described. A first operation ① and a second operation ② are similar to the first operation ① and the second operation ② of FIG. 9, and thus, description thereof may be omitted here to avoid redundancy.

In a third operation ③, the block tracker 113 may search the mapping table 115 for the target identification information IDx and may determine that the target identification information IDx is previously registered at the mapping table 115. That the same identification information is present in the mapping table 115 may mean that the write operation of data with the same content is previously performed.

In a fourth operation ④, the block tracker 113 may search the mapping table 115 for the previous target logical block address LBAxp corresponding to the target identification information IDx. The block tracker 113 may determine that the previous target logical block address LBAxp is different from the target logical block address LBAx. That is, the host device 110 may allocate a changed logical block address to the data with the same content and may perform the re-write operation.

In a fifth operation ⑤, the block tracker 113 may update the mapping table 115 such that the previous target logical block address LBAxp is changed to the target logical block address LBAx. As such, the mapping table 115 may store a pair of the target identification information IDx and the target logical block address LBAx.

In a sixth operation ⑥, the block tracker 113 may provide the storage controller with a request for inheritance of lifetime information. The request for inheritance of lifetime information may include the previous target logical block address LBAxp, the target logical block address LBAx, and the data size of the target data DTx.

In a seventh operation ⑦, the lifetime information updater 122 may search the history table 123 for the previous lifetime information LIxp corresponding to the previous target logical block address LBAxp, based on the request from the block tracker 113. The lifetime information updater 122 may generate the target lifetime information LIx inheriting the previous lifetime information LIxp. For example, a value of the target lifetime information LIx may be the same as a value of the previous lifetime information LIxp. The lifetime information updater 122 may store a pair of the target logical block address LBAx and the target lifetime information LIx in the history table 123. The lifetime information updater 122 may delete the previous target logical block address LBAxp and the previous lifetime information LIxp in the history table 123.

In an eighth operation ⑧, the storage controller may manage the target data DTx based on the target lifetime information LIx stored in the history table 123. Because the target lifetime information LIx inherits the previous lifetime information LIxp, the predicted delete time point of the target data DTx may be the same as the delete time point predicted in the previous write operation corresponding to the previous lifetime information LIxp. As such, even though the logical block address of the target data DTx is changed, the delete time point of the target data DTx may be accurately predicted.

The storage controller may store data having lifetime information similar to the target lifetime information LIx inheriting the previous lifetime information LIxp in the non-volatile memory device 121 together with the target data DTx. In some embodiments, the storage controller may perform the garbage collection operation of the target data DTx based on the target lifetime information LIx. Because the target lifetime information LIx inherits the previous lifetime information LIxp, a delete time point of data or an object may be accurately predicted, and the efficiency of the garbage collection operation may be improved.

Figure 11:
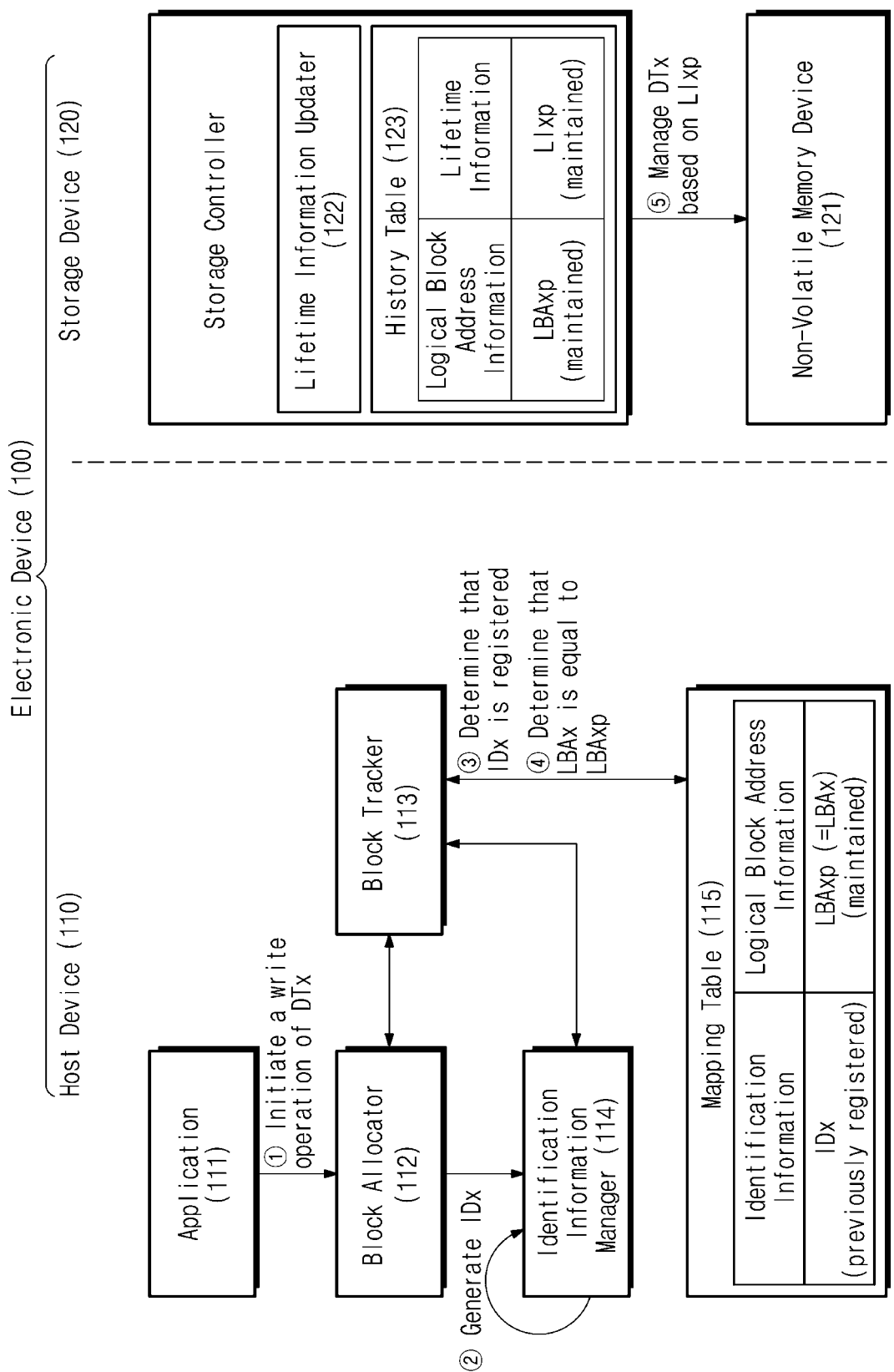
FIG. 11 is a diagram describing a write operation of an electronic device according to some embodiments of the present disclosure.

FIG. 11 is a diagram describing a write operation of an electronic device according to some embodiments of the present disclosure. An operation in which the electronic device 100 performs the re-write operation with regard to the same logical block address of the target data DTx will be described with reference to FIG. 11. The embodiment of FIG. 11 may correspond to the case where it is determined in operation S250 of FIG. 8 that the target logical block address LBAx is not different from the previous target logical block address LBAxp.

The electronic device 100 may include the host device 110 and the storage device 120. The host device 110 may include the application 111, the block allocator 112, the block tracker 113, the identification information manager 114, and the mapping table 115. The storage device 120 may include the non-volatile memory device 121 and a storage controller. The storage controller may include the lifetime information updater 122 and the history table 123.

Below, an operation in which the electronic device 100 performs the re-write operation with regard to the same logical block address of the target data DTx will be described. A first operation ① and a second operation ② are similar to the first operation ① and the second operation ② of FIG. 9, and a third operation ③ is similar to the third operation ③ of FIG. 10. Thus, additional description may be omitted to avoid redundancy.

In a fourth operation ④, the block tracker 113 may search the mapping table 115 for the previous target logical block address LBAxp corresponding to the target identification information IDx. The block tracker 113 may determine that the previous target logical block address LBAxp is the same as the target logical block address LBAx. That is, the host device 110 may allocate the same logical block address to the data with the same content and may perform the re-write operation.

In this case, because there is no change of both data and a logical block address, the block tracker 113 may not update the mapping table 115. The mapping table 115 may maintain a pair of the target identification information IDx and the previous target logical block address LBAxp. The host device 110 may not provide the storage device 120 with a separate request for lifetime information.

In a fifth operation ⑤, the storage controller may manage the target data DTx based on the previous lifetime information LIxp stored in the history table 123. The previous lifetime information LIxp may be generated in the previous write operation of the target data DTx. Because the host device does not provide a separate request for lifetime information in the fourth operation ④, the previous lifetime information LIxp of the history table 123 may not be changed by the re-write operation. The previous lifetime information LIxp may be used to predict more accurately the delete time point of the target data DTx.

Figure 12:
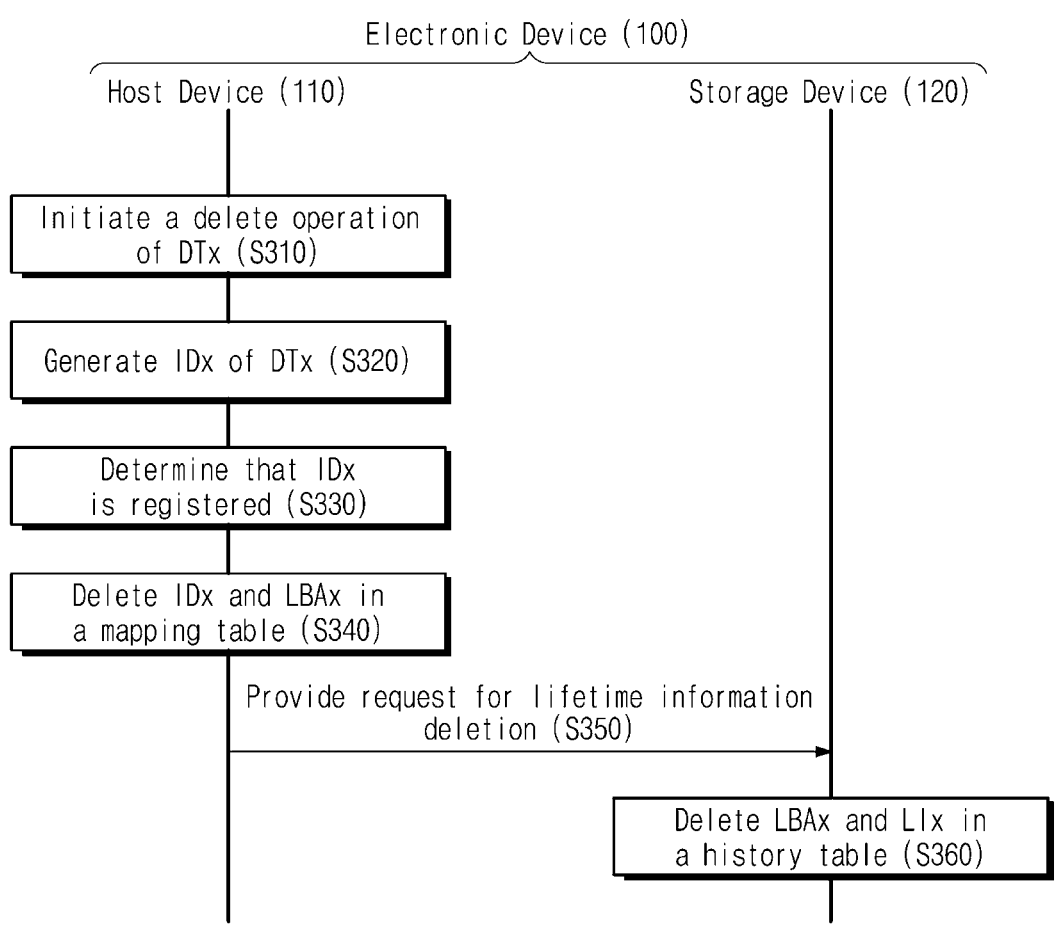
FIG. 12 is a flowchart describing a delete operation of an electronic device according to some embodiments of the present disclosure.

FIG. 12 is a flowchart describing a delete operation of an electronic device according to some embodiments of the present disclosure. Referring to FIG. 12, the electronic device 100 may include the host device 110 and the storage device 120. The host device 110 may include a mapping table. The storage device 120 may include a history table.

In operation S310, the host device 110 may initiate the delete operation of the target data DTx. The target data DTx may be data stored in the storage device 120 based on the write operation before operation S310.

In operation S320, the host device 110 may generate the target identification information IDx of the target data DTx.

In operation S330, the host device 110 may determine that the target identification information IDx is registered at the mapping table. For example, the host device 110 may initiate the write operation of the target data DTx before operation S310 and may store a pair of the target identification information IDx and the target logical block address LBAx corresponding to the target data DTx in the mapping table. The host device 110 may determine that the target identification information IDx in operation S320 is the same as the target identification information IDx stored in the mapping table in the previous write operation.

In operation S340, the host device 110 may search the mapping table for the target identification information IDx, may buffer the target logical block address LBAx, and may delete the target identification information IDx and the target logical block address LBAx in the mapping table.

In operation S350, the host device 110 may provide the storage device 120 with a request for deletion of lifetime information. The request may include the target logical block address LBAx buffered in operation S340.

In operation S360, the storage device 120 may search the history table for a pair of the target logical block address LBAx and the target lifetime information LIx based on the request in operation S350. For example, based on the request in operation S350, the storage device 120 may search the history table for the target logical block address LBAx and may delete the target logical block address LBAx and the target lifetime information LIx in the history table.

Figure 13:
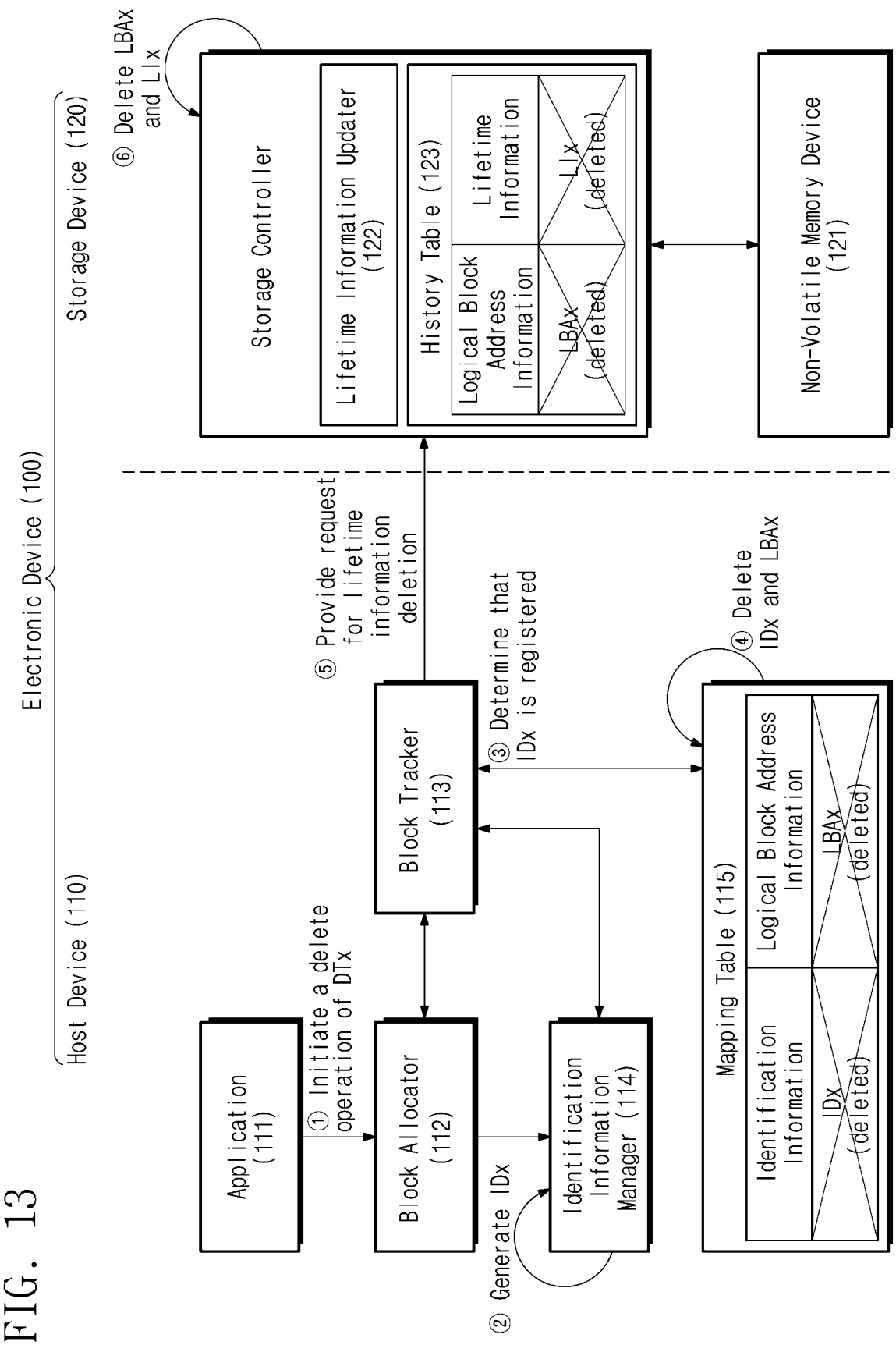
FIG. 13 is a diagram describing a delete operation of an electronic device according to some embodiments of the present disclosure.

FIG. 13 is a diagram describing a delete operation of an electronic device according to some embodiments of the present disclosure. An operation in which the electronic device 100 deletes the target data DTx will be described with reference to FIG. 13. The embodiment of FIG. 13 may correspond to the flowchart of FIG. 12.

The electronic device 100 may include the host device 110 and the storage device 120. The host device 110 may include the application 111, the block allocator 112, the block tracker 113, the identification information manager 114, and the mapping table 115. The storage device 120 may include the non-volatile memory device 121 and a storage controller. The storage controller may include the lifetime information updater 122 and the history table 123.

Below, an operation in which the electronic device 100 deletes the target data DTx will be described.

In a first operation ①, the application 111 may initiate the delete operation of the target data DTx. The block allocator 112 may deallocate the logical block address of the target data DTx under control of the application 111. The block allocator 112 may provide metadata of the target data DTx to the identification information manager 114. The block tracker 113 may track deallocation by the block allocator 112, may obtain the target logical block address LBAx from the block allocator 112, and may request the identification information manager 114 to generate the target identification information IDx.

In a second operation ②, the identification information manager 114 may generate the target identification information IDx corresponding to the target data DTx under control of the block tracker 113. The identification information manager 114 may provide the target identification information IDx to the block tracker 113.

In a third operation ③, the block tracker 113 may search the mapping table 115 for the target identification information IDx and may determine that the target identification information IDx is previously registered at the mapping table 115.

In a fourth operation ④, the block tracker 113 may delete a pair of the target identification information IDx and the target logical block address LBAx in the mapping table 115.

In a fifth operation ⑤, the block tracker 113 may provide the storage controller with a request for deletion of lifetime information. The request for deletion of lifetime information may include the target logical block address LBAx.

In a sixth operation ⑥, the lifetime information updater 122 may delete a pair of the target logical block address LBAx and the target lifetime information LIx in the history table 123, based on the request from the block tracker 113. The storage controller may delete the target data DTx in the non-volatile memory device 121.

Figure 14:
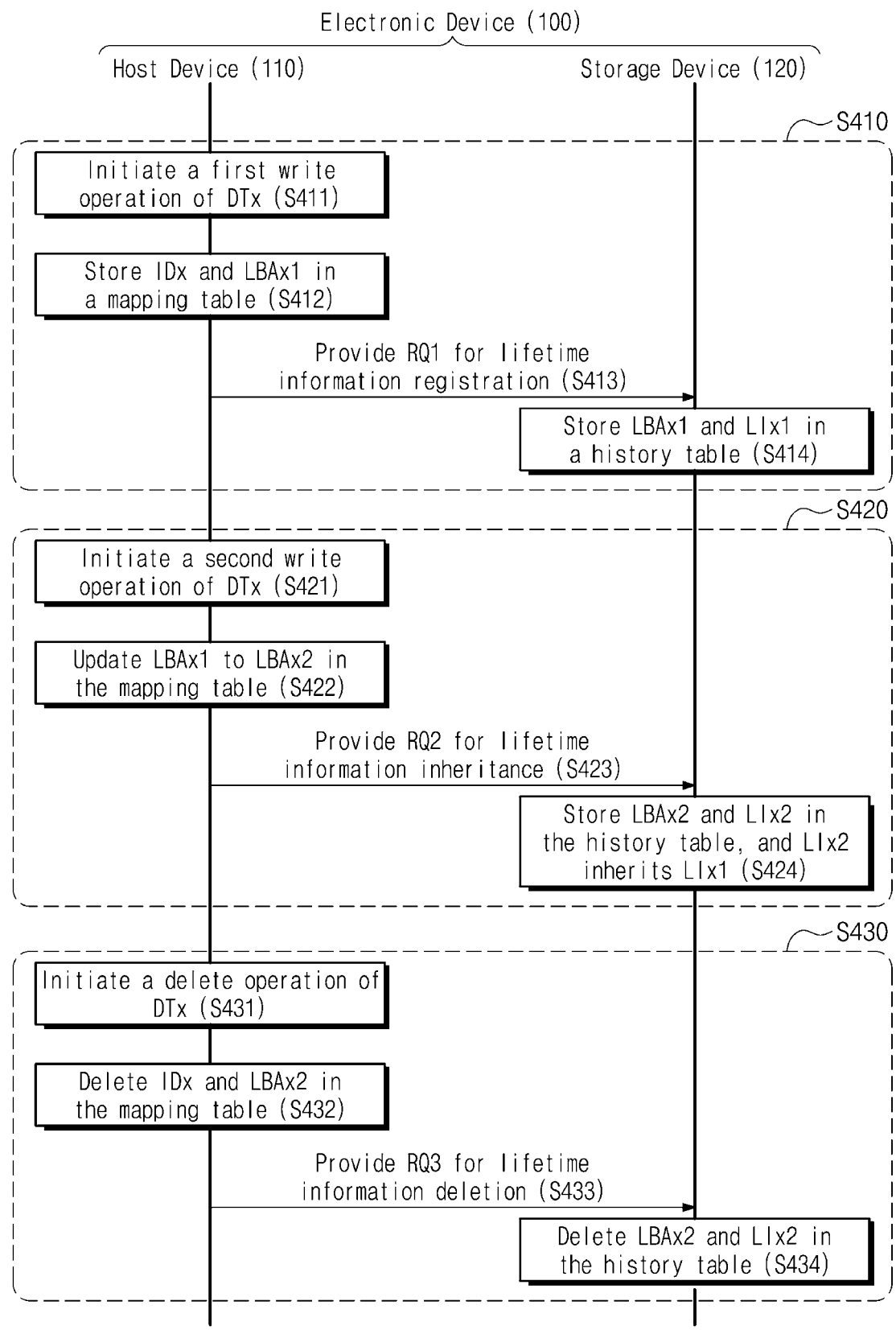
FIG. 14 is a flowchart describing a method of operating an electronic device according to some embodiments of the present disclosure.

FIG. 14 is a flowchart describing a method of operating an electronic device according to some embodiments of the present disclosure. Referring to FIG. 14, the electronic device 100 may include the host device 110 and the storage device 120. The host device 110 may include a mapping table. The storage device 120 may include a history table.

In operation S410, the electronic device 100 may perform registration of lifetime information according to a first write operation. Operation S410 may include operation S411, operation S412, operation S413, and operation S414.

In operation S411, the host device 110 may initiate a first write operation of the target data DTx. The host device 110 may allocate a first logical block address LBAx1 corresponding to the target data DTx. The host device 110 may generate the target identification information IDx for identifying the target data DTx. That is, the host device 110 may initiate the write operation of the target data DTx and the first logical block address LBAx1.

In operation S412, in response to initiating the first write operation, the host device 110 may store a pair of the target identification information IDx and the first logical block address LBAx1 in the mapping table. For example, the host device 110 may determine that the target identification information IDx is not registered at the mapping table, may store the target identification information IDx and the first logical block address LBAx1 in the mapping table, and may generate first lifetime information LIx1 corresponding to the target data DTx based on an average data I/O frequency.

In operation S413, in response to initiating the first write operation, the host device 110 may provide the storage device 120 with a first request RQ1 for registration of the first lifetime information LIx1 corresponding to the first logical block address LBAx1. The first request RQ1 may include the first logical block address LBAx1 and the first lifetime information LIx1.

In operation S414, the storage device 120 may store a pair of the first logical block address LBAx1 and the first lifetime information LIx1 in the history table, based on the first request RQ1.

After performing operation S410, in operation S420, the electronic device 100 may perform inheritance of lifetime information according to a second write operation. Operation S420 may include operation S421, operation S422, operation S423, and operation S424.

In operation S421, the host device 110 may initiate a second write operation of the target data DTx. The content of the target data DTx may be the same as the content of the target data DTx of the first write operation in operation S411. The host device 110 may allocate a second logical block address LBAx2 corresponding to the target data DTx. The host device 110 may generate the target identification information IDx for identifying the target data DTx. That is, the host device 110 may initiate the write operation of the target data DTx and the second logical block address LBAx2.

In operation S422, in response to initiating the second write operation, the host device 110 may update the mapping table such that the first logical block address LBAx1 is changed to the second logical block address LBAx2. In greater detail, the host device 110 may determine that the target identification information IDx is stored in the mapping table, may search the mapping table for the first logical block address LBAx1 corresponding to the target identification information IDx, and may update the mapping table such that the first logical block address LBAx1 is changed to the second logical block address LBAx2.

In operation S423, in response to initiating the second write operation, the host device 110 may provide the storage device 120 with a second request RQ2 for inheritance of the first lifetime information LIx1. The second request RQ2 may include the first logical block address LBAx1, the second logical block address LBAx2, and the size of the target data DTx.

In operation S424, the storage device 120 may store a pair of the second logical block address LBAx2 and second lifetime information LIx2 in the history table, based on the second request RQ2. The second lifetime information LIx2 may inherit the first lifetime information LIx1. In greater detail, the storage device 120 may search the history table for the first lifetime information LIx1 corresponding to the first logical block address LBAx1 based on the second request RQ2, may generate the second lifetime information LIx2 inheriting the first lifetime information LIx1, and may store a pair of the second logical block address LBAx2 and the second lifetime information LIx2 in the history table.

After performing operation S420, in operation S430, the electronic device 100 may perform deletion of lifetime information according to the delete operation. Operation S430 may include operation S431, operation S432, operation S433, and operation S434.

In operation S431, the host device 110 may initiate the delete operation of the target data DTx and the second logical block address LBAx2. The content of the target data DTx may be the same as the content of the target data DTx of the second write operation in operation S421. The host device 110 may generate the target identification information IDx for identifying the target data DTx.

In operation S432, in response to initiating the delete operation, the host device 110 may delete a pair of the target identification information IDx and the second logical block address LBAx2 in the mapping table. In greater detail, the host device 110 may search the mapping table for the second logical block address LBAx2, based on the target identification information IDx and may delete a pair of the target identification information IDx and the second logical block address LBAx2 in the mapping table.

In operation S433, in response to initiating the delete operation, the host device 110 may provide the storage device 120 with a third request RQ3 for deletion of the second lifetime information LIx2. The third request RQ3 may include the second logical block address LBAx2.

In operation S434, the storage device 120 may search the history table for the second logical block address LBAx2, based on the third request RQ3 and may delete a pair of the second logical block address LBAx2 and the second lifetime information LIx2 in the history table.

According to some embodiments of the present disclosure, an electronic device inheriting lifetime information and a method of operating the same are provided.

Also, provided herein are an electronic device that inherits lifetime information of a previous logical block address even in a change of a logical block address of data with the same identification information such that the accuracy of lifetime information is improved, the efficiency of garbage collection is improved, and a write amplification factor WAF decreases, and operating methods of the electronic device.

While the present disclosure has been described with reference to embodiments thereof, it will be apparent to those of ordinary skill in the art that various changes and modifications may be made thereto without departing from the scope of the present disclosure as set forth in the following claims.

What is claimed is:

1. A method of operating an electronic device which includes a host device and a storage device, the method comprising:
   initiating, by the host device, a first write operation of target data and a first logical block address (LBA);
   generating, by the host device, target identification information of the target data in response to initiating the first write operation;
   determining, by the host device, that the target identification information is registered at a mapping table of the host device;
   determining, by the host device, that the first LBA is different from a previous LBA corresponding to the target identification information in the mapping table, in response to determining that the target identification information is registered;
   updating, by the host device, the mapping table such that the previous LBA is changed to the first LBA, in response to determining that the first LBA is different from the previous LBA;
   providing, by the host device, the storage device with a first request for inheritance of previous lifetime information, in response to determining that the first LBA is different from the previous LBA; and
   storing, by the storage device and based on the first request, first lifetime information in a history table of the storage device, the first lifetime information inheriting the previous lifetime information.

2. The method of claim 1, wherein the first request includes the previous LBA, the first LBA, and a size of the target data.

3. The method of claim 2, wherein the storing of the first lifetime information inheriting the previous lifetime information in the history table of the storage device based on the first request by the storage device includes:
   searching, by the storage device and based on the previous LBA, the history table and finding previous lifetime information corresponding to the previous LBA;
   generating, by the storage device, the first lifetime information inheriting the found previous lifetime information; and
   storing, by the storage device, a pair of the first LBA and the generated first lifetime information in the history table.

4. The method of claim 1, further comprising:
   managing, by the storage device, the target data based on the first LBA and the first lifetime information.

5. The method of claim 4, wherein the managing of the target data based on the first LBA and the first lifetime information by the storage device includes:
   determining, by the storage device, that the target data are alive in a garbage collection operation; and
   promoting, by the storage device, the target data to a tenured space based on a live number of times inherited from the previous lifetime information, in response to determining that the target data are alive.

6. The method of claim 1, wherein the previous lifetime information indicates a predicted time period between a generated time point of previous data corresponding to the previous lifetime information and a deleted time point of the previous data corresponding to the previous lifetime information, and
   wherein a value of the first lifetime information is the same as a value of the previous lifetime information.

7. The method of claim 1, wherein the mapping table manages a plurality of identification information and a plurality of LBAs corresponding thereto.

8. The method of claim 1, wherein the history table manages a plurality of LBAs and a plurality of lifetime information corresponding thereto.

9. The method of claim 1, wherein the generating of the target identification information of the target data in response to initiating the first write operation by the host device includes:
   generating, by the host device, the target identification information by combining an inode number of an inode block including the target data and a file offset of the target data;
   generating, by the host device, the target identification information by applying a hash function to the target data; or
   generating, by a file system in the host device, the target identification information.

10. The method of claim 1, wherein the generating of the target identification information of the target data in response to initiating the first write operation by the host device includes:
    dividing, by the host device, a write request block corresponding to the first write operation into a plurality of data; and
    generating, by the host device, a plurality of identification information respectively corresponding to the plurality of data,
    wherein the plurality of data include the target data, and
    wherein the plurality of identification information include the target identification information.

11. The method of claim 1, wherein the initiating of the first write operation of the target data and the first LBA by the host device includes:
    initiating, by the host device, the first write operation for an overwrite operation or a segment cleaning operation of a log-structured file system;
    initiating, by the host device, the first write operation for a de-fragmentation operation of a file system; or
    initiating, by the host device, the first write operation for an object update operation of object based storage.

12. The method of claim 1, further comprising:
    storing, by the host device, a pair of the target identification information and the first LBA in the mapping table, in response to a determination that the target identification information is not registered;
    generating, by the host device, second lifetime information corresponding to the first LBA, in response to determining that the target identification information is not registered;
    providing, by the host device, the storage device with a second request for registration of the second lifetime information; and
    storing, by the storage device, a pair of the first LBA and the second lifetime information in the history table, based on the second request.

13. The method of claim 12, wherein the generating of the second lifetime information corresponding to the first LBA, by the host device, in response to the determination that the target identification information is not registered includes:
    generating, by the host device, the second lifetime information corresponding to the first LBA, based on an average data I/O frequency.

14. The method of claim 1, further comprising:
maintaining, by the host device, a pair of the target identification information and the previous LBA in the mapping table, in response to a determination that the first LBA is not different from the previous LBA.

15. The method of claim 1, further comprising:
initiating, by the host device, a delete operation of the target data and the first LBA;
deleting, by the host device, a registered pair of the target identification information and the first LBA in the mapping table, in response to initiating the delete operation;
providing, by the host device, the storage device with a third request for deletion of the first lifetime information, in response to initiating the delete operation; and
deleting, by the storage device, the first lifetime information in the history table, based on the third request.

16. A method of operating an electronic device which includes a host device and a storage device, the method comprising:
initiating, by the host device, a first write operation of target data and a first logical block address (LBA);
storing, by the host device, a pair of target identification information of the target data and the first LBA in a mapping table of the host device, in response to initiating the first write operation;
providing, by the host device, the storage device with a first request for registration of first lifetime information corresponding to the first LBA, in response to initiating the first write operation;
storing, by the storage device, a pair of the first LBA and the first lifetime information in a history table of the storage device, based on the first request;
initiating, by the host device, a second write operation of the target data and a second LBA, after processing the first write operation;
updating, by the host device, the mapping table such that the first LBA is changed to the second LBA, in response to initiating the second write operation;
providing, by the host device, the storage device with a second request for inheritance of the first lifetime information, in response to initiating the second write operation; and
storing, by the storage device, a pair of the second LBA and second lifetime information inheriting the first lifetime information in the history table, based on the second request.

17. The method of claim 16, further comprising:
initiating, by the host device, a delete operation of the target data, after processing the second write operation;
deleting, by the host device, a pair of the target identification information and the second LBA in the mapping table, in response to initiating the delete operation;
providing, by the host device, the storage device with a third request for deletion of the second lifetime information, in response to initiating the delete operation; and
deleting, by the storage device, a pair of the second LBA and the second lifetime information in the history table, based on the third request.

18. An electronic device comprising:
a host device including a mapping table; and
a storage device including a history table,
wherein the host device is configured to:
initiate a write operation of target data and a target logical block address (LBA);
generate target identification information of the target data in response to initiating the write operation;
determine that the target identification information is registered at the mapping table;
determine that the target LBA is different from a previous LBA corresponding to the target identification information in the mapping table, in response to determining that the target identification information is registered; and
in response to determining that the target LBA is different from the previous LBA, update the mapping table such that the previous LBA is changed to the target LBA and provide the storage device with a request for inheritance of previous lifetime information, and
wherein the storage device is configured to store, based on the request and in the history table, target lifetime information that inherits the previous lifetime information.

19. The electronic device of claim 18, wherein the host device further includes:
an application configured to initiate the write operation;
a block allocator configured to allocate a write request block under control of the application;
a block tracker configured to track block allocation of the block allocator and to manage the mapping table;
an identification information manager configured to divide the write request block into a plurality of data under control of the block tracker and to provide the block tracker with target identification information about the target data among the plurality of data; and
a lifetime information generator configured to generate the previous lifetime information based on an average data I/O frequency, under control of the block tracker.

20. The electronic device of claim 19, wherein the host device includes a file system and a device driver,
wherein the application provides the file system with a system request corresponding to the write operation,
wherein the block allocator and the block tracker are implemented on the file system, and
wherein the identification information manager, the mapping table, and the lifetime information generator are implemented on the device driver.

* * * * *